US010922933B2

(12) United States Patent
Linguanti et al.

(10) Patent No.: US 10,922,933 B2
(45) Date of Patent: Feb. 16, 2021

(54) SYSTEMS AND METHODS FOR EFFICIENT SEATING IN AMUSEMENT PARK VENUES

(71) Applicant: Universal City Studios LLC, Universal City, CA (US)

(72) Inventors: Nicholas Linguanti, Orlando, FL (US); Jake Louden, Orlando, FL (US); Brian Carey, Celebration, FL (US); Jessica Harned, Orlando, FL (US); Andrew Jackson Biar, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 16/408,212

(22) Filed: May 9, 2019

(65) Prior Publication Data

US 2019/0347911 A1    Nov. 14, 2019

Related U.S. Application Data

(60) Provisional application No. 62/834,209, filed on Apr. 15, 2019, provisional application No. 62/669,172, filed on May 9, 2018.

(51) Int. Cl.
*G08B 5/22* (2006.01)
*G06Q 10/06* (2012.01)

(52) U.S. Cl.
CPC ....... *G08B 5/221* (2013.01); *G06Q 10/06316* (2013.01); *G06Q 10/06393* (2013.01)

(58) Field of Classification Search
CPC ............. G08B 5/221; G06Q 10/06316; G06Q 10/06393
See application file for complete search history.

(56) References Cited

U.S. PATENT DOCUMENTS

| | | | |
|---|---|---|---|
| 7,895,066 B2 | 2/2011 | Waytena et al. | |
| 2005/0080533 A1 | 4/2005 | Basir et al. | |
| 2007/0050199 A1 | 3/2007 | Ishibashi et al. | |
| 2009/0204449 A1* | 8/2009 | Waytena | G06Q 10/02 705/5 |
| 2010/0328025 A1 | 12/2010 | Razdan | |
| 2016/0055429 A1 | 2/2016 | Schwartz | |
| 2017/0193420 A1* | 7/2017 | Tiwari | G06Q 10/06398 |
| 2017/0372551 A1* | 12/2017 | Bruce | G07C 9/00571 |

OTHER PUBLICATIONS

PCT/US2019/031609 Search Report and Written Opinion dated Jun. 28, 2019.

* cited by examiner

*Primary Examiner* — Nabil H Syed
(74) *Attorney, Agent, or Firm* — Fletcher Yoder P.C.

(57) ABSTRACT

A system for providing seating guidance for an attraction ride vehicle of an amusement park attraction includes a computing device associated with a display, one or more processors of the computing device, and one or more memory devices of the computing device storing information about the attraction ride vehicle and storing instructions corresponding to a seating application. The seating application, when executed by the one or more processors, causes the computing device to: provide an interface to receive seating input data for a guest or a group of guests, process the seating input data in combination with the information about the attraction ride vehicle based on seating logic to provide guidance data, and outputting guidance, based on the guidance data, for loading the guest or the group of guests onto the attraction ride vehicle via the display.

20 Claims, 10 Drawing Sheets

| ATTRACTION 1 | | ATTRACTION 2 | |
|---|---|---|---|
| | SCORE | | SCORE |
| TEAM A | | TEAM C | |
| OPERATOR 1 | 20 | OPERATOR 5 | 10 |
| OPERATOR 2 | 15 | OPERATOR 6 | 45 |
| TEAM B | | TEAM D | |
| OPERATOR 3 | 35 | OPERATOR 7 | 18 |
| OPERATOR 4 | 25 | OPERATOR 8 | 22 |

SYSTEMS AND METHODS FOR EFFICIENT SEATING IN AMUSEMENT PARK VENUES

CROSS REFERENCE TO RELATED APPLICATIONS

This application claims priority from and the benefit of U.S. Provisional Application Ser. No. 62/669,172 entitled "SYSTEMS AND METHODS FOR EFFICIENT LOADING OF A RIDE VEHICLE", filed May 9, 2018, and U.S. Provisional Application Ser. No. 62/834,209 entitled "QUEUE MONITORING, ANALYTICS, AND GAMIFICATION SYSTEMS AND METHODS", filed Apr. 15, 2019, both of which are hereby incorporated by reference in their entirety for all purposes.

BACKGROUND

The present disclosure relates generally to the field of amusement parks. More specifically, embodiments of the present disclosure relate to methods and equipment utilized to manage amusement park experiences, including seating for amusement park rides and other attractions. Embodiments of the present disclosure also relate to techniques to improving management of amusement park experiences.

There is an increasing demand for amusement park experiences. While guests have demanded bigger, better, and more elaborate attractions, they also require and expect a positive overall experience. Providing a positive overall experience for amusement park guests entails addressing certain issues related to efficient use of attractions because this has been identified as impacting associated wait times among other aspects of guest experiences. Indeed, it is now recognized that park guests can be deterred from returning to a particular amusement park due to negative experiences with waiting times. Accordingly, it is now recognized that it is desirable to improve amusement park systems and methods that impact efficient use of ride systems and other attractions.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In an embodiment, a system for providing seating guidance for an attraction ride vehicle of an amusement park attraction includes a computing device associated with a display, one or more processors of the computing device, and one or more memory devices of the computing device storing information about the attraction ride vehicle and storing instructions corresponding to a seating application. The seating application, when executed by the one or more processors, causes the computing device to: provide an interface to receive seating input data for a guest or a group of guests, process the seating input data in combination with the information about the attraction ride vehicle based on seating logic to provide guidance data, and outputting guidance, based on the guidance data, for loading the guest or the group of guests onto the attraction ride vehicle via the display.

In an embodiment, an amusement park venue includes an arrangement of seats to accommodate guests, and a computing device associated with the amusement park venue and having one or more processors and one or more memory devices. The one or more memory devices store information about the amusement park venue and store instructions corresponding to a seating application. The seating application, when executed by the one or more processors, causes the computing device to: provide an interface to receive seating input data for a guest or a group of guests, process the seating input data in combination with the information about the amusement park venue based on seating logic to generate guidance data, and output guidance, based on the guidance data, that provides direction for the guest or the group of guests to particular seats of the amusement park venue via a display communicatively coupled to the one or more processors.

In an embodiment, a tangible, non-transitory, machine-readable medium, includes machine-readable instructions executable by a processor to: present at least a portion of a seating application on a graphical user interface (GUI) via a display of a computing device. The computing device has access to a queue and seating computer system, and the queue and seating computer system includes features that allow for control over virtual queueing and seating for one or more amusement park attractions. The portion of the seating application has a seating guidance user interface (UI) associated therewith. The instructions are also executable to allow a seating guidance process to be performed via the GUI and the seating guidance UI using analytics data associated with seating efficiency for the one or more amusement park attractions, the analytics data defining indicators or metrics. The machine-readable instructions are configured to cause a portion of the GUI rendered on the display to include a plurality of interaction elements that affect the manner in which the seating guidance process is performed according to seating logic associated with the seating application.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
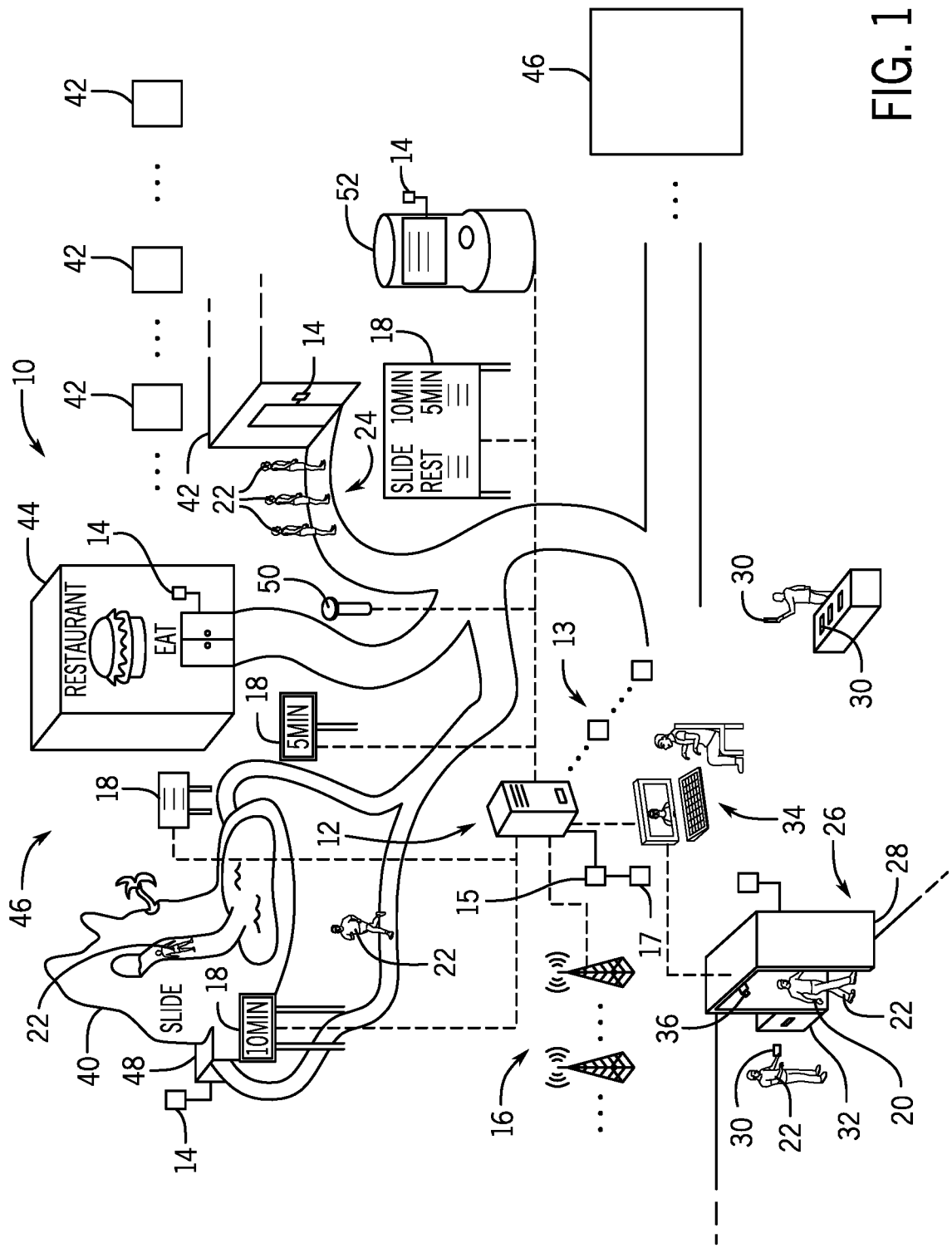
FIG. 1 is a schematic view of a theme park including a queue monitoring system in accordance with an embodiment of the present disclosure.

Reference will now be made in detail to specific embodiments illustrated in the accompanying drawings and figures. In the following detailed description, numerous specific details are set forth in order to provide a thorough understanding of the disclosure. However, it will be apparent to one of ordinary skill in the art that embodiments may be practiced without these specific details. In other instances, well-known methods, procedures, components, have not been described in detail so as not to unnecessarily obscure aspects of the embodiments.

The terminology used herein is for the purpose of describing particular embodiments only and is not intended to be limiting. As used in the description and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, operations, elements, components, and/or groups thereof. Further, as used herein, the term "if" may be construed to mean "when" or "upon" or "in response to determining" or "in response to detecting," depending on the context.

Theme park or amusement park attractions/experiences have become increasingly popular, and various amusement park attractions have been created to provide guests with unique motion and visual experiences. Guests entering the various amusement park attractions may utilize a queue monitoring system that places the guests in a virtual queue rather than a physical queue, which allows the guests to enjoy other features of the amusement park while their position in the virtual queue advances. By introducing virtual queue functionality to an attraction, the flow of guests arriving at the attraction is impacted. For example, when using the queue monitoring system, a guest is given a return time range to enter the attraction. However, because the guest is not required to return at an exact time, the flow of guests returning to the attraction varies throughout the day and is challenging to predict.

The disclosed embodiments of the queue monitoring system may include or be associated with a computer-based system that may assist operators in loading guests onto a ride or ride vehicle by grouping a number of guests based on a number of available seats within, for example, a row and/or column of a ride vehicle associated with an attraction. The computer-based system may include, for example, one or more application-specific or general purpose computing devices that are specifically programmed to execute logic associated with guest seating for rides of attractions. In particular, the computer-based system may include one or more server computers that are configured to store information associated with one or more attractions of an amusement park, and one or more computing devices (e.g., portable computing devices) that are configured to communicate with the server computers for software updates, logic updates, attraction information updates, and so forth. The portable computing devices may be programmed with specific applications or sets of instructions that provide ride operators the ability to assign seating in a controlled and efficient manner, to provide feedback and/or analytics relating to rides to the server computers, and to view various information relating to seating and/or queue metrics. The server computers, portable computers, the hardware and/or software associated with such computing devices, may together be considered a computer-based system configured to monitor and control queues associated with rides, and configured to monitor and control seating and seating arrangements associated with rides, and may be referred to as a queue monitoring and seating assignment system.

In certain embodiments, monitoring and control of the queue and monitoring and control of seating assignment may be performed by the same computing devices and using the same software programs. In other embodiments, the monitoring and control of the queue and monitoring and control of seating assignment may be performed by the same computing devices and using different software programs. In still further embodiments, the monitoring and control of the queue and monitoring and control of seating assignment may be performed by different computing devices using different or the same software programs. Any combination of these configurations may be implemented in certain embodiments. Indeed, in accordance with this disclosure, a "queue management system" may refer to a computer-based system that integrates queue management features (e.g., devices and software) with seating assignment features (e.g., devices and software).

For convenience, embodiments of the computer-based system that are configured to monitor, control and/or assist seating assignments associated with rides may be referred to herein as a seating assignment system. When integrated with queue management, the seating assignment system may be considered to be an integrated portion (e.g., a subsystem) of the queue management system. Thus, the present disclosure may use the phrase "queue management system" to refer to a system that incorporates the seating assignment system. However, unless specifically noted otherwise, this does not necessitate the presence of queue management features in a particular embodiment or example.

In accordance with certain disclosed embodiments, the queue management system may allow operators to group guests in a manner such that a steady flow of guests are ready to enter the attraction at each load cycle (e.g., loading ride vehicles of the attraction). This may result in decreased wait times for the attraction and a concomitant increase in guest satisfaction. Indeed, it is now recognized that a system for facilitating efficient seating arrangements and monitoring of such arrangements is desired. Disclosed embodiments of the queue management system may analyze numerous variables to facilitate timely seating, appropriate accommodation of guests based on individual and/or group requirements of the guests, efficient use of seat space, accommodation of groups that wish to experience attractions together, and so forth. A graphical user interface (GUI) of the queue management system may intuitively assist a ride operator in efficiently loading a ride vehicle or a ride associated with an attraction. For instance, in one embodiment, a persistent ride state model may be maintained in a software application running on a portable computing device of the queue management system (e.g., in an application stored and executed/running a tablet computer). The persistent ride state model may contain information about the attraction such as a number of ride vehicles for the attraction, available seats in each row of each ride vehicle, availability and location of any wheelchair-accessible seats, whether seats are "offline-able," whether the attraction allows service animals, and so forth. The GUI associated with the system may allow a ride operator to alter aspects of the ride state model, for example via a touch interface, to indicate special circumstances such as taking a seat offline or indicating the presence of a service animal or wheelchair-bound guest, which modifies the seat assignment logic.

The disclosed queue management system may also provide, for example via the GUI, information related to attraction analytics that may be used to evaluate operator loading practices and improve guest throughput and attraction wait times. For example, the queue management system may provide information (e.g., analytics) associated with attraction capacity (e.g., number of guests loaded onto the attraction), number of guests in the queue (e.g., guests waiting to be loaded), available and occupied seats in the attraction, positions of available seats, among other information that allows the operator to group guests according to a number of available seats within a ride vehicle of the attraction.

Outputs of the queue management system in accordance with certain disclosed embodiments may include perceivable feedback, such as tactile, visual and/or audible guidance from a computer, such as a portable tablet computer, or other features such as environmental features. As one example, such feedback may include flashing lights or audio played in the physical space. This guidance may allow an operator to instruct riders/guests more efficiently. However, this guidance may be overridden. If a delinquent party does not follow directions to their assigned seats and chooses different seats, a ride operator may manually change their seat assignment to accommodate the party's choice of seats to the extent it is appropriate. Note that, in some embodiments, tracking of actual seat positions relative to guidance provided may be monitored with various different detection systems. For example, cameras may be utilized to identify guests in particular seats. Operators may also adjust seating information, for example using the GUI, to maintain accurate seating information. Seats occupied per group may later be compared with guidance data to track ride loading efficiency (e.g., the extent to which guidance matches guest preferences and/or actual seating locations). Further, in some embodiments, gating features may be used to direct guests to seats based on the guidance provided by the system. For example, certain gates in a blocked off queue may be opened to encourage proper loading. Additionally or alternatively, show effects may be used to direct guests to the proper/appropriate seating.

The disclosed queue management system may also include additional features that motivate (e.g., via gamification) attraction operators to efficiently manage guest throughput and enable the attraction operators and/or other amusement park personnel to retrieve information (e.g., reports, analytics, operator metrics) from servers or other local and/or remote memory storage systems to evaluate guest throughput and attraction wait times. For example, operators and other amusement park personnel may have access to information associated with a desired attraction that allows the operators and/or park personnel to determine how to improve a flow of guests though the attractions. As discussed above, the queue management system may include integrated gamification features, which may incentivize the operators to improve guest throughput and loading practices for their assigned attraction. The gamification features may allow operators to play/compete with operators of other attractions throughout the amusement park. In certain embodiments, wait times, throughput, and other metrics may be tracked by the queue management system, and these metrics may be integrated into a gaming environment managed by a gaming module (e.g., a software package associated with the queue management system). Thus, in certain embodiments the operators may use the gaming environment to compete for shortest wait times and highest throughput for their respective attractions. The queue monitoring system may rank the operators (or team of operators) based on their wait times and/or guest throughput quantities. The rankings may be displayed on a leaderboard accessible to employees of the amusement park, for example via the GUI associated of the queue management system. Incorporating gamification features into the queue monitoring systems may incentivize operators to improve their loading practices and guest throughput efficiency.

Various metrics, such as throughput, seating efficiency, and so forth, may be tracked by the queue management system based on sensor input and/or manual input (e.g., entries from ride operators). For example, instructions may cause the queue management system to provide guidance within a limited timeframe and provide guidance that describes a timeframe for seating. For example, a particular logic may set an expected average of 1.6 seconds per guest seating in order to meet desired attraction goals. This time may be monitored and advisories (e.g., via the GUI) may be provided when goals are not being met.

As an example of the manner in which the queue management system may operate to control seating assignments, portable computing devices of the queue management system may implement, using software for seating assignment control, system logic (logic rules) for seating so that guests may be seated in such a way as to maximize availability for future parties. For example, instructions may provide guidance that assigns guests to be seated in rows with the smallest number of available seats. As a specific example, if a ride operator is seating a party of two, and there are two available seats in Row 1 and three available seats in Row 2, the party must be seated in Row 1, e.g., is assigned or instructed to sit in Row 1, leaving room for a future party of three to take the seats in Row 2. Similarly, system logic may require that, if a guest changes his or her mind and decides not to ride after having been assigned a seat, the ride operator must fill the newly vacant seat with a new guest, and be able to do so quickly. The instructions or logic may compute optimal guest seating in compliance with any defined requirements. This may be done dynamically as riders are loaded or in advance based on a predetermined size, preference, or other parameter or set of parameters associated with a boarding group.

FIG. 1 is a schematic representation of a system 10 for facilitating queuing and seating in accordance with the present disclosure. The system 10 includes a computer system 12 (e.g., a network of computers 13 each including hardware such as at least one processor 15 and at least one memory 17), monitoring sensors 14, a wireless communication system 16, system displays 18, guest-associated devices 20 (e.g., a bracelet including accessible data and communication features, a guest mobile device) and other components that coordinate in accordance with certain embodiments, as will be described in detail below. The network of computers 13 may include application-specific or general purpose computing devices, such as portable computing devices, servers, desktop computing devices, and so forth.

Specifically, it should be noted that certain disclosed embodiments facilitate virtual queuing, as well as ride seating coordination, such that amusement park guests 22 can obtain a position within a virtual queue and subsequently enter a physical queue 24 or standby loading group of limited length and be seated in an orderly fashion. Present embodiments may function to limit time spent by guests in physically waiting and encourage participation in other areas of an amusement park, such as dining, shopping, and other entertainment venues (e.g., rides, shows). Accordingly, in one embodiment, the attraction queue is mediated via the virtual queue and a standby queue. Further, admittance to the virtual queue may be open to guests with mature return times. For example, a guest with a return time range of 2 pm-2:15 pm has a mature return time at or after 2 pm and will be admitted to the virtual queue entrance at any time at or after 2 pm that day while the ride is open. While certain guests will be more likely to present themselves at the virtual queue entrance within their return time range, other guests may be delayed until after the time associated with their return time, creating variability in the number of guests that enter via the virtual queue. That is, while the return times for each time slot may be distributed to encourage a steady flow of guests (e.g., via distributing a particular number of return times at each time slot), the actual entry via the virtual queue is more unpredictable. In addition, the virtual queue may also allow guests with entitlement passes to be admitted. Because such guests do not have return times, their entry may also be unpredictable. Therefore, as discussed in further detail below, an operator of the attraction may use information displayed on the operator device to load the guests onto the attraction in a manner that improves guest throughput and wait times for the attraction.

When guests 22 arrive at a ticketing location 26 (e.g., hotel front desk, kiosk, guest service counter, park gate), the guests 22 may be provided with entry credentials (e.g., tickets or active wearables 20) among other items, such as a park map, virtual queuing instructions, and amenities instructions. Informational media (e.g., audio, video) and instructional signage may be present at all such ticketing locations. In some instances, the guests may have obtained entry credentials prior to arrival and may skip acquiring such credentials at the ticketing location.

The guests 22 may enter and be provided entry into the park or a park area via an entryway 28. If the guests already have their entry credentials or an identification code or number transferred into an active wearable ("AW") or guest-associated device, the guests may be provided essentially direct access to the park or park area. For example, the guests with properly activated guest-associated devices 20 may be allowed to walk through the entryway without stopping. The credentials associated with the guest-associated device 20 being held or worn by the guests 22 will be detected and provided to a gate monitoring facility that may be monitored by a park employee (e.g., a security service company). For example, this may include providing a photograph of the guest (e.g., a photograph of the guest's face) passing through the entryway. Thus, the photograph may be used for entry privilege confirmation. In other embodiments, other features may be used, such as fingerprints or other identifying aspects (e.g., facial recognition). While certain embodiments of the disclosure are illustrated in conjunction with a particular type of guest-associated device (e.g., active wearable), it should be understood that the disclosed techniques may be implemented with different types of guest-associated devices that are configured to wirelessly communicate guest information, such as pocket-carried devices, handheld devices, or mobile devices. In particular embodiments, the guest-associated devices are waterproof.

If the guests 22 do not have their guest-associated device 20 with them or if their guest-associated device 20 is not properly activated, they may insert ticket media 30 into a scanner 32 (or RFID touchpoint), which facilitates transfer of information to the gate monitoring facility 34, which may include any of a number of gate monitoring systems, and informs a park employee that the guest is authorized to enter the park or park area. If authorization is granted in this manner, a guest-associated device 20 may be distributed to them and a photograph of the guest's face automatically taken. For example, a photograph may be automatically taken by a camera 36 positioned proximate the entryway. The same camera 36 or images captured by the camera 36 may be used for monitoring purposes as well, e.g., for monitoring guest entrance and/or exit from attraction environments. In other embodiments, the images of the guests acquiring their guest-associated device 20 may occur in a different location. Further, in some embodiments, the guests 22 may acquire their guest-associated device after progressing through the entryway 28 or prior to progressing through the entryway 28.

Wait times for desired attractions may be ascertained by guests by viewing displays provided at numerous locations throughout the park or park area. At certain or all attractions, displays 18 provide the wait time for the specific attraction. For example, a water slide 40 as shown in FIG. 1 includes a display 18 that specifically provides a wait time for that attraction. The information for each display 18 may be provided based on information obtained by tracking AWs 20 or otherwise monitoring park areas (e.g., ride exits and entrances) with monitoring sensors 14. Further, at the exit of certain or all attractions, a display may be provided to indicate the wait times for all attractions (e.g., all attractions in the park or park area). For example, the exit area of the water slide 40 includes a display 18 that may provide wait times for all of the surrounding attractions (e.g., rides 42). The display may even provide wait times for non-ride attractions, such as a wait time for a restaurant 44. The display 18 may be limited to display of wait times for attractions within a particular park area 46 (e.g., a park "village"). Also, within each park area 46, one or more wait time boards (e.g., centrally located displays) may indicate wait times for all park attractions or attractions within the park area. Further still, guest portable devices (e.g., mobile phones) may run mobile applications that display wait times or other information associated with park areas 46.

In one embodiment, the guest 22 enters the queue by walking to the attraction entry and walking through an entry portal. For example, the guest 22 may walk to the water slide 40 and walk through its attraction station (e.g., portal) 48. Once the guest 22 walks through the attraction station 48, the guest's guest-associated device 20 will notify him/her (e.g., via a tone, vibration, illuminator) of being added to the virtual queue. This may be achieved by detecting the guest-associated device 20 with the monitoring sensor 14. In another embodiment, the guest 22 may enter the virtual queue by walking to a queue entry post 50, which may indicate the name of the attraction and current wait time, and engaging the post 50 with the guest-associated device 20. The posts 20 may be located at the exit or entry of each attraction and at a central location within each park area 46 or village. In one embodiment, an individual post 50 may be associated with only one attraction such that engaging with the post automatically enters the guest in the virtual queue of the associated attraction, e.g., the virtual queue is entered without any guest selection between different attractions at the post 50, and tapping or engaging the post is the selection step for selecting the associated attraction. In particular embodiments, the queue entry post and/or the attraction station, when positioned proximate an attraction, may function as an entrance validator for guests already in a virtual queue.

The queue entry post 50 and the attraction station 48 may have similar functionality to one another for adding guests to a virtual queue. In addition, the attraction station 48, when positioned proximate the attraction, such as at the ride entry, may also include functionality for communicating whether the guest has a valid entry position to the attraction. Validation may include near field communication with the guest-associated device to access the user identification associated with the guest-associated device when a guest taps into the attraction station. The user identification is then communicated to a central virtual queue control system remote from the attraction station, which in turn accesses the real-time queue position associated with the user identification, performs rules-based filtering, and provides a validation output of a valid or an invalid position in the virtual queue for attraction entry.

Once the guest engages the queue entry post 50, the guest's guest-associated device 20 will notify the guest (e.g., via a tone, vibration, illuminator) of being added to the virtual queue. For example, the guest-associated device may receive a signal to cause the displayed information on the guest-associated device to change. Further, the post 50 may additionally or alternatively provide a notification of successful addition to the queue. The notification may be generated and/or communicated by a central virtual queue control system to the guest-associated device. In another embodiment, the notification is generated and/or communicated by the queue entry post 50. In yet another embodiment, the guest may enter the virtual queue by walking to a virtual queue station, which may be implemented as a queue kiosk 52 (e.g., a single device that displays the names and wait times for all virtual queuing attractions in the park or park area). Queue kiosks 52 may be located at the entry or exit of each attraction and in a central location within each park area. The guest selects the queue he/she wishes to enter and engages (e.g., taps) the kiosk 52 with his/her guest-associated device. Once the guest engages the queue kiosk 52, the guest's guest-associated device will notify the guest (e.g., via a tone, vibration, illuminator) of being added to the virtual queue. For example, the guest-associated device may receive a signal to cause the displayed information on the guest-associated device to change. Further, the kiosk 52 may additionally or alternatively provide a notification of successful addition to the queue. The notification to the guest-associated device may be communicated via a near field communicator of the queue kiosk 52. Alternatively, the notification to the guest-associated device 20 may be communicated via a long or medium range communicator and may be communicated from a central control system and not from the queue kiosk 52.

The queue management system of the present disclosure may be considered a tool that allows a steady traffic pattern when the number of guests entering through a virtual queue entrance varies over time. For example, the queue management system may facilitate and/or coordinate control by access control devices, ride operators, and so forth.

While virtual queues for guests assist in decreasing wait times for attractions compared to attractions with only physical queues, the manner in which the operator loads the guests from a queue (e.g., virtual and standby queues) into the attraction may also affect guest throughput and attraction wait times. Loading practices that allow the guests to randomly select their seat and row may results in empty seats positioned between groups of seated guests. The operator may have to identify and attempt to fill the empty seats, typically single seats, which may delay release of the ride vehicle and increase wait times. In addition, because guests typically ride an attraction with a group of friends and/or family, it may be difficult for the operator to fill empty seats that would require the guests to be separated from their group of friends and/or family. For example, the guests may elect to wait for the next ride vehicle where they may sit next to one another. Therefore, the ride vehicle may be released from the loading area with empty seats, which may decrease guest throughput for the attraction. Accordingly, the queue monitoring system disclosed herein may include an operator interface that enables the operator to group guests according to the number of riders in their group and the number of available seats in each row of the ride vehicle for a particular attraction. For example, an operator interface in accordance with present embodiments may include features that allow the operator to easily and quickly identify empty seats, occupied seats, number of guests loaded onto the ride vehicles, and other information that may facilitate loading of the guests onto the attraction. The operator interface may also provide information to the operator related to the number of guests in the virtual queue, the number of guests in the standby queue, and associated wait times. As discussed in further detail below, the queue monitoring system may analyze the information and provide the operator with feedback for improving guest loading practices. In certain embodiments, the operator interface may include gamification features that enable the operator to compete with operators of other attractions within the amusement park. The operators may view, in essentially real time, a score or ranking for each operator participating in the gamification that is based on guest loading practices (e.g., attraction wait times, guest throughput).

Figure 2:
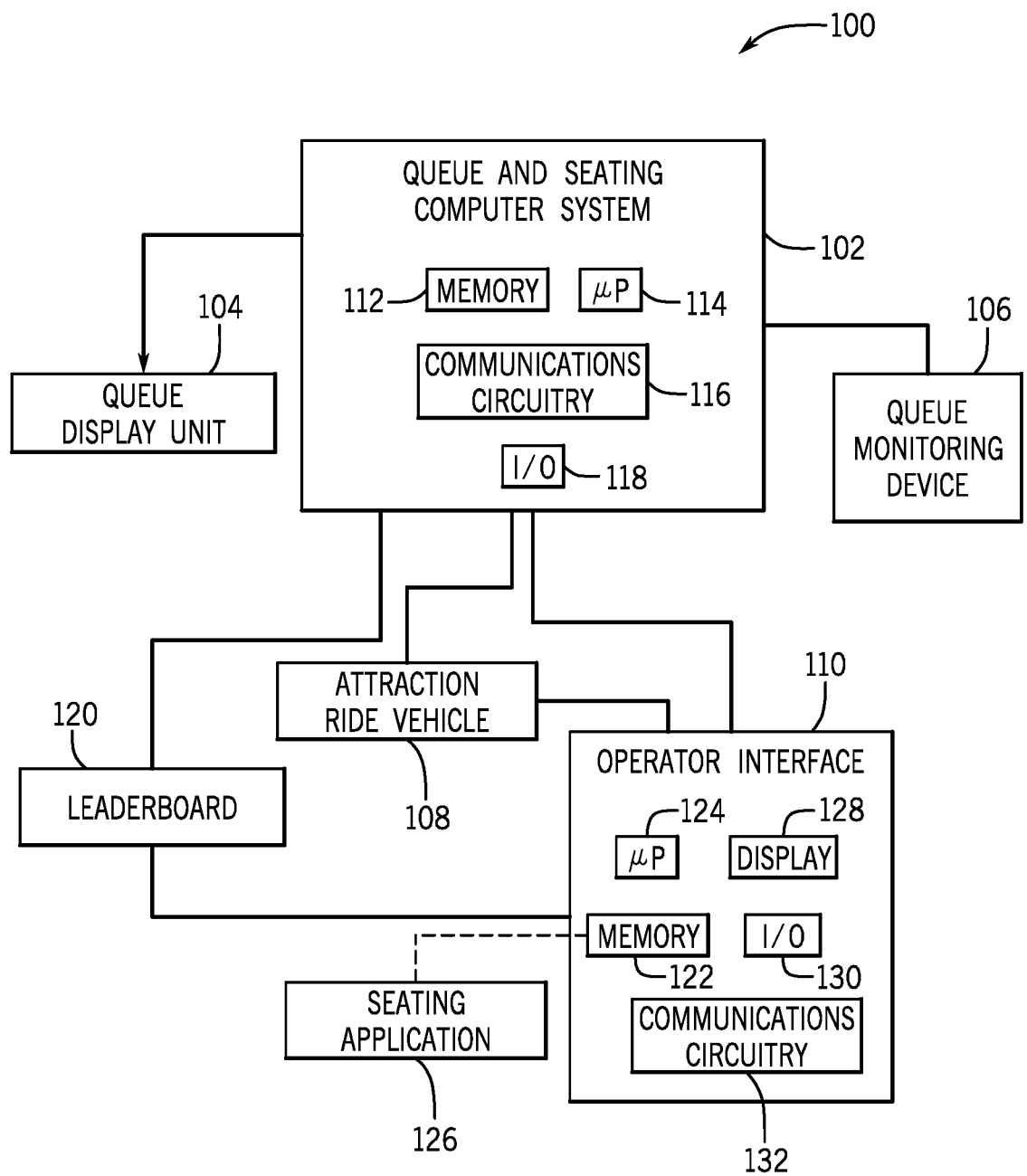
FIG. 2 is a block diagram of a queue management system in accordance with an embodiment of the present disclosure.

FIG. 2 illustrates an embodiment of a queue management system 100 that includes integrated queue management, seating assignment, analytics and gamification features. In the illustrated embodiment, the queue management system 100 includes a queue and seating computer system 102, which may be a part of the network of computers 13 referenced in FIG. 1. The illustrated queue and seating computer system 102, as shown, is communicatively coupled to, and may coordinate the operation of, a queue display unit 104 and a queue monitoring device 106 to allow for monitoring, coordination and control of virtual and physical queues of various of the attractions. These attractions may each include respective ride vehicles, as generally represented by ride vehicle 108.

As one example workflow, to enter the virtual queue for an attraction, a guest-associated device (e.g., device 20 of FIG. 1) transmits a queue request signal to the queue and seating computer system 102 in response to an input received based on activation or detection of the device 20. The queue and seating computer system 102 receives the queue request signal, determines a wait time for the guest 22, and outputs a wait time signal to the guest-associated device 20, the queue display unit 104, an operator interface 110 as described below, or a combination thereof. The guest-associated device 20, the queue display unit 104, and the operator interface are configured to receive the wait time signal and display the wait time for the guest 22 (e.g., via the guest-associated device 20) and the operator (e.g., via the operator interface 110).

In certain embodiments, the queue monitoring device 106 may be configured to monitor or determine current virtual and/or physical queue conditions, including, but not limited to, the length of the queue, number of guests 22 in the queue, flow rate of the guests 22 entering and exiting the queue, particular individuals within the queue (e.g., identify guests 22 in the queue), number of sub-queues within the queue, types of guests 22 within the queue, and so forth. In certain embodiments, the queue monitoring device 106 may monitor particular locations (e.g., geographical location, queue zones) within the queue and output the number of guests 22 in each particular location to the queue and seating computer system 102. In certain embodiments, the queue monitoring device 106 may monitor guests 22 not just at the beginning or end of the queue, but may also monitor whether guests 22 leave the queue in the middle of the queue. In certain embodiments, the queue monitoring device 106 may determine various characteristics of the guests 22 (e.g., size, gender, age, number) within the queue and output that data to the queue and seating computer system 102 to track and record historical throughput data associated with the queue as it relates to the attraction.

In certain embodiments, the queue monitoring device 106 includes a counting mechanism configured to monitor queue conditions. For example, the number of guests 22 within the queue may be monitored with a counting mechanism, which may be a manual system and/or may include one or more sensors disposed proximate to the queue. In other embodiments, the queue monitoring device 106 may include at least one sensor (e.g., optical sensors, cameras, mechanical treadles, RF sensing systems) disposed physically proximate to the queue. The sensors may provide continuous feedback associated with current queue conditions to the queue and seating computer system 102. For example, in situations where guests 22 each carry RF identification (e.g., in one of the wearables 20), RF sensors associated with the queue monitoring device 106 may be configured to monitor when the particular guest(s) enters and exits the queue and output that data to the queue and seating computer system 102.

As a further example, the sensors may be configured to recognize individual guests 22 at the entrance and exit of the queue and continuously output that information to the queue and seating computer system 102, such that various conditions of the queue (e.g., wait time, queue length) may be calculated based on length of time individual guests 22 spend within the queue. In addition, the sensor data may be used to count admitted guests 22. In another embodiment, the sensor may be a camera that is positioned to capture multiple entrances and/or queues. Based on the image data from the camera or multiple such cameras, the queue and seating computer system 102 may resolve or count guests 22 for multiple queues at once. Further, the guest counting information may be used as input to one or more entrance control devices, such as a mechanical gate positioned at an entrance. Based on the remaining guest count, the mechanical gate may be controlled to open or close by the queue and seating computer system 102.

As also illustrated, in certain embodiments, the queue and seating computer system 102 may be communicatively coupled to one or more attraction ride vehicles 108 associated with the attractions. While depicted as being directly communicatively coupled, in other embodiments the queue and seating computer system 102 may be communicatively coupled to other computing devices (e.g., ride control systems) that are directly in communication with the attraction ride vehicle 108. Such communication may allow the queue and seating computer system 102 to collect and store information relating to the attraction ride vehicle 108, such as usage rates, whether all or a portion of the attraction ride vehicle 108 is offline, and so forth. Additionally or alternatively, as discussed herein, such information may be provided by other devices, such as an operator interface 110 communicatively coupled (e.g., directly or indirectly via a ride control system) to the queue and seating computer system 102.

The queue and seating computer system 102 of the illustrated embodiment includes at least one memory device 112 storing various instructions, logic, etc., to allow implementation of the queue techniques described herein. The memory devices described herein may include machine-readable media such as RAM, ROM, EPROM, EEPROM, or optical disk storage, magnetic disk storage or other magnetic storage devices, or any other medium which can be used to carry or store desired program code in the form of machine-executable instructions or data structures and which can be accessed by a processor or by other processor-based devices (e.g., mobile devices). The at least one memory device 112 stores instructions, logic, etc., that allow the seating arrangement techniques described herein. The at least one memory device 112 may also store logic (e.g., instructions) associated with analysis of queueing and seating metrics, gamification logic, and so forth. Indeed, in certain embodiments, the at least one memory device 112 may store information associated with various attractions including usage, seating metrics, operator metrics, and so forth. That is, in certain embodiments the queue and seating computer system 102 may also operate as a database. In other embodiments, a specialized computing device may be in communication with the queue and seating computer system 102 to serve as a database accessible by, for example, a plurality of the operator interfaces 110. At least one processor 114 of the queue and seating computer system 102 is configured to execute the instructions stored on the at least one memory device 112 to implement the queue management, seating assignment, analysis, and gamification techniques described herein.

The queue and seating computer system 102 may also include communications circuitry 116 to allow for communication between the queue and seating computer system 102 and various other devices, including the attraction ride vehicle 108, operator interface 110, queue monitoring devices 106, the queue display unit 104, and so forth. By way of example, the communications circuitry 116 may include wired or wireless communications hardware. The communications circuitry referenced herein with respect to various devices may include antennas, radio transceiver circuits, signal processing hardware and/or software (e.g., hardware or software filters, A/D converters, multiplexer amplifiers), or a combination thereof. The communications circuitry may be configured to communicate over wired or wireless communication paths via IR wireless communication, satellite communication, broadcast radio, microwave radio, Bluetooth, Zigbee, Wi-Fi, UHF, NFC, and so forth. Such communication may also include intermediate communications devices, such as radio towers, cell towers, and the like. One or more input/output devices 118 may also be associated with the queue and seating computer system 102, including communications ports, interface devices (e.g., mouse, keyboard, touchscreen interface), displays, and so on.

The illustrated embodiment of FIG. 2 also includes a leaderboard 120 associated with the queue and seating computer system 102. The leaderboard 120 as illustrated may represent a part of a software package stored on the at least one memory device 112 (e.g., a gaming module grouping gaming logic to place metrics into a gaming environment), or a separate device that is in communication with the queue and seating computer system 102. Thus, the leaderboard 120 may be entirely virtual (e.g., displayed on various computing devices), or may be an actual physical display with appropriate hardware and software configurations to present statistics (e.g., efficiency scores or metrics) associated with seating and/or queue gamification implemented at various attractions throughout an amusement park. Various examples of the leaderboard 120 are described in further detail below.

The operator interface 110, as illustrated, may be communicatively coupled to the queue and seating computer system 102, to the attraction ride vehicle 108, and to the leaderboard 120. The operator interface 110 may include, by way of example, a portable computing device, such as a tablet computer, that allows a ride operator to access various software applications associated with a virtual queue for an attraction, and/or software applications associated with ride loading for the attraction ride vehicle 108. The operator interface 110 may therefore include one or more memory devices 122 storing the software applications, and one or more processors 124 to execute them. For instance, as specifically shown in FIG. 2 and described in further detail below, the one or more memory devices 122 may store a seating application 126 that can be run by the one or more processors 124 to enable the operator to load the attraction ride vehicle 108 in accordance with logic programmed into the application 126.

The operator interface 110 therefore includes a display 128 to allow the operator to see, and input/output devices 130 (e.g., touch screen, keyboard, stylus) to allow the operator to interact, with the application via a graphical user interface (GUI) associated with the seating application 126. Communications circuitry 132 of the operator interface 110 allows communication between the operator interface 110 and the queue and seating computer system 102, the attraction ride vehicle 108, and the leaderboard 120, as well as other computing devices.

In certain embodiments, the operator interface 110 may also be used for initiating emergency stops of the attraction ride vehicle 108, to dispatch the attraction ride vehicle 108, to initiate restraint lockdown of restraints on the attraction ride vehicle 108, and so forth. In accordance with certain disclosed embodiments, for example, the operator interface 110 is configured to monitor a status of an attraction (e.g., attraction wait times, number of guests in queue) and control operating parameters of the attraction (e.g., start, pause, resume, reset, or otherwise adjust a parameter of the attraction).

In particular embodiments, the processor 124 and memory 122 of the operator interface 110 may allow execution of instructions for arranging groups and/or individual guests 22 onto the attraction ride vehicle 108 based on location and quantity of unoccupied seats in the attraction ride vehicles 108. For example, if a group of 3 guests 22 are next in the attraction queue, the operator interface 110 may receive an input of 3 into a group size field of the GUI from an operator. The operator interface 110 may then output a recommendation of where the group of guests 22 should be seated, such as in a row having 3 adjacent unoccupied seats. In certain embodiments, if the group of guests 22 exceeds the number of unoccupied seats in a given row, the operator interface 110 may output a recommendation to direct a portion of the guests 22 in the group to one row and a second portion of the guests to a different row within the attraction ride vehicle 108.

Additionally, the processor 124 and the memory 112 of the operator interface 110 may allow execution of instructions for analyzing information (e.g., data) associated with guest throughput and attraction wait times using the operator interface 110. For example, the processor 124 may execute instructions that analyze various metrics. Such metrics may include how many guests 22 from a standby line, the virtual queue, or both, loaded onto the attraction ride vehicle 108 for each ride cycle and/or over a predetermined time period (e.g., from opening to closing of the amusement park ride, operator shift); daily and/or hourly throughput of guests 22 loaded onto the attraction ride vehicles 108; quantity of unoccupied seats per ride cycle; quantity of active ride vehicles; attraction wait times, delays, and any other information associated with loading practices and/or guest throughput for a respective attraction.

In certain embodiments, the operator interface 110 may be configured to retrieve reports associated with the attraction. The reports may contain information associated with average wait times, number of guests 22 loaded onto the attraction ride vehicles 108 over a desired time interval, park and/or attraction peak hours, guests 22 in a virtual queue, guests in a standby queue, attraction delays, maintenance schedules, statistics, and any other suitable information associated with the attraction. In certain embodiments, the operator interface 100 may be configured to permanently or temporarily store operator metrics (e.g., for later upload to the queue and seating computer system 102). Operator metrics may include operator loading practices that may be determined based on attraction wait times, guest throughput, delays, percentage of unoccupied seats per ride cycle, and any other suitable information associated with performance of the operator at their assigned attraction. The operator interface 110 may transmit reports and operator metrics to park management teams for review.

In certain embodiments, the processor 124 and memory 122 of the operator interface 110 may allow execution of instructions for entering a gamification mode (e.g., execute gaming logic) that enables the operator to interact (e.g., compete) with operators form other attractions or associated amusement parks in a gaming environment. The gamification mode may be integrated with the analytics and the seating application 126, and may have gaming logic that converts various operator-related metrics into one or more scores associated with a particular operator. The scores can be updated in real-time, for example during a shift, during a ride cycle of a particular attraction, and so forth. For example, the operator interface 110 may be configured to enter a gamification mode (including a gaming environment) and send a request to another operator interface 110 associated with another attraction (or the same attraction) within the amusement park or other commonly owned amusement park in a different geological location to enter the gamification mode. This allows for ride operators to compete as groups or in head-to-head matchups for better scores relating to ride throughput.

In addition to organizing guests on the attraction ride vehicle 108 using the operator interface 110, the operator interface 110 is also configured to allow an hourly capacity of an attraction to be set along with a standby interval. The operator interface 110, in certain embodiments, may then be used to start an attraction ride cycle. Further, the operator interface 110 may also be configured to allow for entry of manual downtimes for the attraction. If such downtimes involve interruptions to the operation of the attraction, the operator interface 110 may be configured to present new return times for guests 22 scheduled to return during the attraction downtime. The guests 22 may be permitted to select among offered return times in accordance with virtual queue logic of the queue and seating computer system 102.

Based on the monitored status information, the display 128 may be used to visually instruct an operator to admit up to a specified number of guests and to group the admitted guest based on a number of available seats and location of the available seats on the ride vehicle, in accordance with the logic of the seating application 126. For example, using the input/output devices 130 the operator may enter a number of riders in a group (e.g., 4 riders) into the operator interface 110. The operator interface 110 may display a row number having the number of available seats needed for the group (e.g., 4 available seats). Further examples of these displays are provided below.

Figure 3:
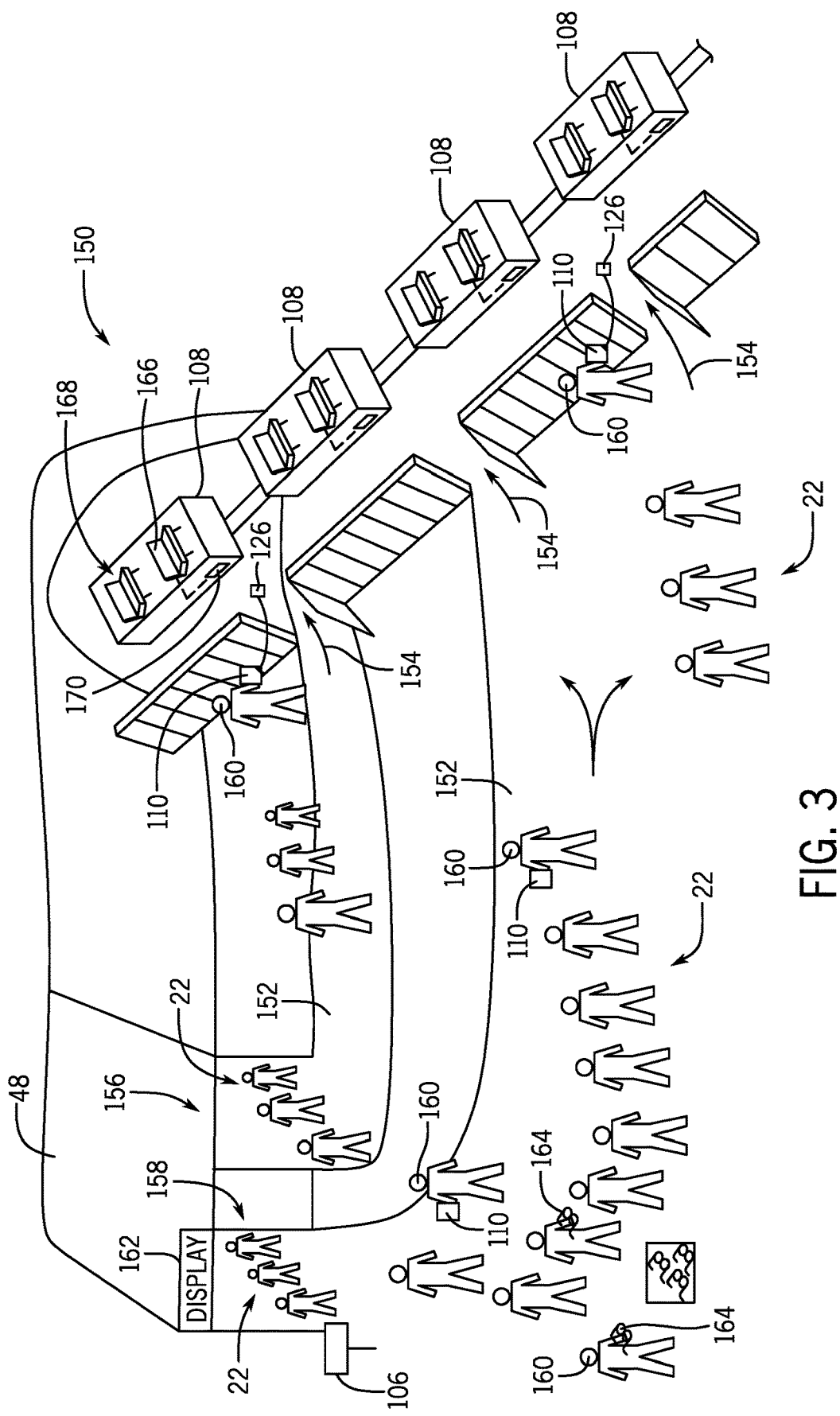
FIG. 3 is a schematic view of an attraction loading area used in conjunction with the queue management system of FIG. 2, in accordance with an embodiment of the present disclosure.

While a number of configurations may be possible for integration of the queue management system 100 with an attraction, FIG. 3 is a schematic illustration of one example embodiment of an attraction loading area 150 that uses the queue management system 100 to enhance attraction efficiency. In the illustrated embodiment, the attraction loading area 150 includes a plurality of paths 152 that lead from the attraction stations 48 to entryways 154 controlling access to a plurality of the attraction ride vehicles 108. In the attraction loading area 150, the guests 22 may enter via a virtual queue entrance (e.g., a return time entrance) 156 and/or via a standby entrance 158 associated with a traditional queue or a virtual queue. As shown, the path 152 associated with the virtual queue entrance 156 may have a shorter line and a concomitant shorter wait time due to more efficient control of when the guests 22 are encouraged to enter the attraction loading area 150.

During each time interval of the attraction, the number of guests 22 admitted through the entrances 156, 158 is counted by an applicable people-counting method (e.g., counter, sensor as provided herein). Again, this information may be relayed to the queue and seating computer system 102 of FIG. 2 for analysis to determine appropriate throughput and seating arrangements in accordance with presently disclosed embodiments. The throughput and seating arrangements suggested by the system 102 may, in turn, be relayed to operator interfaces 110 used by one or more operators 160 of the attraction to encourage efficient loading of the attraction ride vehicles 108.

As an example workflow, the guests 22 with appropriate credentials are permitted to continually enter the virtual queue entrance (e.g., the return time entrance 156). For each ride interval, one or more of the queue monitoring devices 106 may provide feedback to the queue and seating computer system 102 to allow the system logic of the queue and seating computer system 102 to determine how many of the guests 22 to admit via the standby entrance 158 during the next interval. The algorithms/logic to determine how many standby guests may be allowed to enter may use various inputs provided by the queue monitoring devices 106, operator interfaces 110, and other amusement park features. For example, the inputs may include a total number of previous guest entries (e.g., from previous ride intervals) from both the virtual queue entrance 156 and the standby entrance 158.

The people-counting method as performed, for example, by one or more of the queue monitoring devices 106 at the standby entrance 158, counts guests as they enter, and this information is used to update a standby entrance display 162 (e.g., via the queue and seating computer system 102). In response to determining that no further guests 22 should enter via the standby entrance 158, the standby entrance display 162 may be instructed by the queue and seating computer system 102 to provide a visual indication that instructs the operators 160 manning the standby entrance 158 that the attraction is at capacity for guests entering through the standby entrance 158.

During operation of the attraction, systems operations may be performed to facilitate filling unused capacity with guests from the standby queue. The queue and seating computer system 102 may track analytics for the operators 160 admitting guests from the standby and/or virtual queue entrances 158, 156 into the attraction loading area 150 or other areas preceding the attraction loading area. For example, if the operator 160 admits more standby guests than indicated as permissible, operator efficiency metrics may be affected. In an implementation where such metrics are integrated into a gaming environment, for example via a score, operations that cause decreases in efficiency may result in reduced scores or other gaming penalties.

As illustrated in FIG. 3, once guests 22, such as virtual queue guests, single rider queue guests, special accommodation source guests (VIP tours, child swap/child switch, and so forth), and standby guests are permitted to enter the attraction loading area 150, the guests 22 may enter the attraction at the direction of one or more of the operators 160. For attractions that involve props or equipment distribution, one or more operators 160 may be assigned to distribute such equipment. The distribution may also be subject to rules and other time goals. For example, distribution of wearables 164 associated with the attraction (e.g., augmented reality/virtual reality headsets) may be accomplished with a goal of a certain amount of time per guest (e.g., distribute the wearables 164 at a rate of 2 seconds per guest). Further, any associated assistance may also be tracked and subject to efficiency goals and metrics, for example via a gaming environment.

In accordance with disclosed embodiments, certain of the operators 160 may utilize one of the operator interfaces 110 to run the seating application 126, to access the leaderboard 120, for queuing instructions, and so forth. The seating application 126 may be associated with a persistent ride state model, which is also stored in the one or more memory devices 122 of the operator interface 110 and/or in the one or more memory devices 112 of the queue and seating computer system 102. The persistent ride state model may be maintained in the seating application 126, and contains information about the attraction such as a total number of the attraction ride vehicles 108, available seats 166 in each row 168 of each of the attraction ride vehicles 108, the availability and location of any wheelchair-accessible seats, whether seats are "offline-able," whether the attraction allows service animals, and so forth. The persistent ride state model may be used to render an interface that is specific for every attraction, i.e., an attraction-specific graphical user interface (GUI). As described in further detail below with respect to FIGS. 10-11, though there may be similarities between how the GUI is used for interactions, the particular look and feel of the GUI for each attraction may be unique.

The seating application 126 may also implement logic-based seating rules, which are used to provide guidance to the operator 160 using the operator interface 110 to efficiently load the attraction ride vehicles 108. Indeed, metrics may be tracked by the queue and seating computer system 102 relating to, for instance, how efficiently a particular operator 160 loads one or more of the attraction ride vehicles 108 using the seating application 126 (e.g., according to the logic-based seating rules).

As the guests 22 are directed to the attraction ride vehicles 108 having available seats 166, the metric may be tracked on a per vehicle basis or on a per cycle basis. In one example, a single operator may be responsible for loading a subset of the attraction ride vehicles 108. That operator's metrics may be tracked and compared to those of another operator loading a different subset of the attraction ride vehicles 108 (for the same attraction). In embodiments where the metrics are integrated into a gaming environment, one of the operators 160 or a group of the operators 160 may have a higher score based on a lower number of empty seats and/or a faster loading time. To assess these metrics and, in some embodiments, integrate them into a gaming environment, the queue and seating computer system 102 may assess one or more of the following non-limiting parameters:

1. A seat assignment operator: the ability of an operator to designate seat assignments for groups of guests 22 of different sizes to attraction ride vehicles 108 having available seats 166. Scores may be based on minimizing a total number of empty seats 166 for a group of attraction ride vehicles 108 within an allotted seating timeframe of a ride cycle, or a fastest time to complete loading of one or more attraction ride vehicles 108, for example.
2. A seating operator: the ability of an operator to execute seating instructions for designated attraction ride vehicles 108 according to the logic-based rules established by the seating application 126.
3. A queue operator: the ability of an operator to maintain flow of guests 22 through the queue.

The queue and seating computer system 102 may receive information about loaded and/or empty seats 166 from operator inputs via the operator interface 110 and/or from sensors associated with the attraction. For example, each seat 166 may have a corresponding sensor 170 that provides a signal based on loading of one of the guests 22 in the seat 166. The sensors 170 may include camera systems (e.g., computer vision), pressure sensors, restraint position sensors, actuators for guest restraints, sensors that detect user devices (e.g., near field sensors, RFID sensors), and so forth. While each seat 166 may have a corresponding sensor 170, each sensor 170 may monitor one, or more than one seat.

For example, image data from one or more cameras in the attraction loading area 150 may be used to determine which seats 166 are empty or occupied. In another embodiment, one of the operators 160 may use the GUI of the seating application 126 to manually indicate which seats 166 are available. The signals, which may include a seat status and a seat location, are provided to the queue and seating computer system 102, which then updates the operator interface 110 to indicate available seats and/or loaded or unavailable seats, e.g., in a seat map 180 as shown in the example simplified schematic of FIG. 4. The completed seat map 180 of empty seats 182 and available seats 184 may be provided to the queue and seating system 102 to assess the metrics and operator performance for each ride cycle. Such maps may be associated with individual attraction vehicles 108, such that metrics for an individual operator responsible for loading a subset of the vehicles may be scored based on his/her designated vehicles. It should be understood that the disclosed embodiments may also be used in conjunction with non-vehicle or non-seat based loading of guests in an attraction, such as loading guests into harnesses or VR assemblies.

As previously noted, the seating application 126 may assist the operator 160 in loading the attraction ride vehicle 108 in accordance with programmed logic rules to enhance loading efficiency. In particular, one embodiment of a logic rule programmed into the seating application 126 may require (via one or more logic rules) that no more than one guest can be assigned to a single passenger seat 166 on one of the attraction ride vehicles 108.

It should be noted that a single passenger seat 166 indicates a location designed to hold a single rider. Some attraction ride vehicles 108, however, may include bench seating with no individual restraint or individual seat delineation. Further, some ride vehicles have a bench that can seat several passengers and these passengers share a lap bar or other restraint mechanism. Accordingly, the number of seats 166 per bench may depend on an average number of guests 22 that can be accommodated by each bench or may depend on a similar normalization strategy. As another example of a logic rule programmed into the seating application 126, for attractions having such bench seating, each row "x" is assigned a non-negative integer "Gx" as a seat number. For example, a bench designed to seat three guests may have a Gx of 3. According to the logic rules, the seating application 126 may only allow assignment of no more than "Gx" riders to row "x" for each cycle of the associated attraction. If one of the operators 160 or sensor input indicates that a particular guest 22 requires multiple seats 166, the logic takes this into account and reduces the available seating by an appropriate amount for the row 186 assigned to the guest 22.

Another example of a logic rule programmed into the seating application 126 may require that guests 22 with certain characteristics must be seated in specific types of seats. Depending on the attraction, anywhere from 0% to 100% of a fleet of attraction ride vehicles 108 may contain one or more such specific seat types. These seats may be highlighted on the seating map 180, as described below. This may assist operators 160 in guiding guests 22 to the appropriate seats.

Another logic rule associated with the seating application 126 may allow or disallow service animals to be loaded onto one of the attraction ride vehicles 108. Service animals may or may not be allowed on the vehicle 108 depending on the attraction (e.g., the nature of movement of the attraction ride vehicle 108, available restraints).

In some embodiments, logic rules of the seating application 126 may allow for individual seats on the attraction ride vehicle 108 to be "offline-able," which means individual seats are designated as unavailable for use. In an attraction with "offline-able" seats, the attraction ride vehicle 108 can remain in service while individual seats are deemed unavailable for use, or "offline." Logic rules may prevent guests from ever being assigned to an offline seat during ride operation.

Logic rules of the seating application 126 may also address issues related to party seating, which may operate to increase guest satisfaction. For example, certain of the logic rules may prioritize options or require arrangements for parties of two or more such that no party member may be assigned a seat 166 which is isolated from all other members of the party. This may include a logic operation that requires accommodation of parties using as few rows 168 of seats 166 as possible. For example, if all members of a party can fit in one row 168, the logic rules may require that the party must be assigned seats 166 together in the same row 168. Another example of such a logic operation is assignment of seating for a party such that the party must always be seated in a continuous group of rows 168. Specifically, for example, referring to FIG. 4, if a party requires three rows 168 of seats 166, the logic may prevent assignment of seats 166 in rows 2, 4, and 6 because 2, 4, and 6 are not continuous. Rows 2, 3, and 4, however, would be allowed because 2-4 are continuous integers, which indicates that they are adjacent rows in the illustrated embodiment.

In accordance with presently disclosed embodiments, the logic rules associated with the seating application 126 may be updated to reflect these policies for particular attractions. For example, each of the operator interfaces 110 may regularly receive updates, for example via the queue and seating computer system 102, to update the logic rules and/or other aspects of the seating application 126.

An example workflow may proceed as follows in accordance with the example display of the operator interface 110 shown in FIG. 4, i.e., the seat map 180. The operator 160 may view how many available seats 182 and occupied seats 184 are in each row 168, and group guests 22 accordingly. Once grouped, the guests 22 may wait in their assigned groups for the next attraction ride vehicle 108 to approach for boarding. In one example, a ride operator 160 inputs the party size of the next party to be loaded onto the attraction ride vehicle 160, and the seating application 126 computes the optimal seat assignment for that party according to the attraction's loading logic, as configured in the ride state model. The seating application 126 displays this seat assignment (e.g., via highlighting on a graphical seat map) to the ride operator 160, who then relays the information to the party of guests 22. Depending on the attraction, at this point another ride operator 160 may escort the party to their seat assignment, or guests 22 may advance themselves to their assigned seats 166 with a secondary securement evaluation to occur before the attraction ride vehicle 108 is dispatched.

Upon arrival of another attraction ride vehicle 108, the guests 22 may board the ride vehicle 108 and occupy the seats 166 in accordance with their assigned seating. In embodiments where unoccupied seats 182 remain on the attraction ride vehicle 108 after the guest groups have boarded the attraction ride vehicle 108, the operator 160 may view the display 128 to identify the location and quantity of unoccupied seats 182. The operator 160 may offer the unoccupied seats 182 to guests 22 in the queue or standby lines and easily direct them to their assigned seat 166. In this way, the guests 22 may be efficiently loaded onto the attraction ride vehicle 108 and a number of empty seats 182 may be decreased, thereby improving guest throughput and decreasing attraction wait times compared to loading practices that allow guests 22 or an operator 160 to select a row 168 and seat 166 without regard to the logic of the seating application 126.

The seating application 126 may update the display 128 associated with a particular ride vehicle as it is loaded with guests 22 in real-time. Again, this may be done based on feedback from sensing equipment (e.g., cameras and software configured to detect human forms), based on input via the seating application 126, or a combination of such feedback and input. Thus, if guests 22 change their minds or refuse their given seat assignments, a ride operator 160 can add or remove guests 22 from seat assignments directly in order to update the seat map 180 to accurately reflect the observed physical location of each guest in the seats of the attraction ride vehicle 108.

As may be appreciated, disclosed embodiments operate such that attractions using the queue management system 100 have efficient traffic flow. Because the queue management system 100 is independent from an individual show cycle, the queue management system 100 is capable of accommodating traffic variations over a larger period of time, and across multiple platforms when compared to a single ride cycle. The automated nature of the queue management system 100 eliminates the manual counting or guesswork by the team member operating entrances and loading ride vehicles. The queue management system 100 does not require the queue entrances to be located in close proximity. This is particularly advantageous in cases where guests 22 in the standby queue are physically spaced apart from guests 22 in the virtual queue such that a single operator 160 cannot determine how many virtual queue guests relative to standby guests are present.

As set forth above, certain analytical logic and/or gamification logic may be programmed into the computing devices of the queue management system 100, such as the queue and seating computer system 102 and the operator interface 110. In this way, the queue management system 100 may be considered to include a queue analysis and gamification system, which may be implemented across several devices, with the queue and seating computer system 102, for example, acting as a server for various analytical and gaming environments provided via the operator interfaces 110 or other equipment, such as a display specifically rendering the leaderboard 120.

As one example, the analytical logic and/or gamification logic may be stored on the at least one memory device 112 of the queue and seating computer system 102. The queue and seating computer system 102 may, in turn, push new configurations, updates, and so forth, to devices that implement the analysis logic and/or gamification logic at the user level. For instance, the logic may be integrated with the seating application 126 to simultaneously allow the operator interface 110 to provide ride loading recommendations, track operator loading efficiency, and subsequently allow an operator to obtain feedback as to the operator's performance metrics. The analytical logic and/or gamification logic may utilize a variety of inputs to allow the logic to provide meaningful feedback and motivation as appropriate.

By way of non-limiting example, inputs to the queue monitoring and gamification system may include one or more of the following: Hourly Ride Capacity (e.g., a number of guests 22 that can experience the attraction per hour, which may be set via the operator interface 110); Cycle Time (e.g., a time per attraction cycle); Cycle Capacity (e.g., a number of accommodated guests 22 per attraction cycle, which may be pre-set based on attraction run time and/or time spent in pre-show and/or loading); Time Remaining (e.g., time remaining in cycle); Overruns (e.g., calculated by the queue management system 100); virtual queue admits (e.g., a number of guests 22 admitted during a cycle as provided via a signal from the queue monitoring device 106); standby pending (e.g., standby guests in line as provided via a signal from the queue monitoring device 106); Standby Admit Now (e.g., an output to the queue display unit 104 and/or the operator interface 110 with standby admit instructions); Standby Admits (e.g., standby guests admitted as provided via a signal from the queue monitoring device 106); Paused/Unpaused; Number of Cycles; Total Run Time; Total Capacity; and Cycle Time in Seconds.

The analysis logic of the queue management system 100 may allow queuing and loading to be adaptive processes that are automatically coordinated based on any of the above inputs. As one example scenario to help illustrate, if a cycle capacity (e.g., total number of seats 166 that can be occupied) is 40 total guests and there are no virtual queue guests available, instructions generated by the queue and seating computer system 102 will cause the queue display unit 104 to show 40 standby admits for the cycle (e.g., 2 minutes). The guests 22 from the standby queue may be admitted as a group to improve flow through the particular ride cycle.

Once these guests 22 from the standby queue are admitted, the instructions provided to the queue display unit 104 will update (via instructions from the queue and seating computer system 102) to indicate that the cycle is full and no unoccupied seats 182 are available for the standby queue guests for the remainder of the ride cycle. At the end of the ride cycle, the instructions may again be updated by the queue and seating computer system 102 to indicate a new group of 40 potential admits. If seats 166 for virtual queue guests are available, all virtual queue guests are admitted until the capacity of all attraction ride vehicles 108 is full or until there are no more virtual queue guests waiting to be seated. If all virtual queue guests are admitted and there is remaining capacity in the ride cycle (e.g., 10 spaces) during the remaining cycle time, standby queue guests may be admitted as a group, if available, or on a rolling basis for the remainder of the ride cycle to fill the remaining unoccupied seats 182. Accordingly, the queue management system 100 does not require and may not use a preset ratio of virtual queue guests relative standby queue guests, but instead responds to real-time traffic conditions to dynamically alter the admittance from the standby queue based on the virtual queue conditions and to fill the attraction.

Using the techniques set forth herein, the operator interface 110 may be used to provide queue and seating guidance to ride operators 160, and may also provide an environment in which operators or groups of operators may compare their attraction efficiency skills with one another via a gaming environment. The various inputs noted above may be used alone or in combination to determine/calculate an operator and/or team score in a gaming environment using the gamification mode of the operator interfaces 110.

When the operator 160 enters the gamification mode on the operator interface 110, the operator's goal is to stay at or below the set threshold for attraction wait times and/or exceed the threshold for the minimum number of guests loaded onto the attraction ride vehicle 108 (and/or all attraction ride vehicles 108) over time. The points computed by the gamification logic may be based on a comparison between the threshold values and the attraction wait time and/or the guest throughput during the time the operator 160 was assigned to the attraction. As an example, the operators 160 may be scored based on the number of points earned while in the gamification mode. The score for each of the operators 160 or team of operators 160 (e.g., a group of operators assigned to a single attraction) may be displayed on the display 128 of the operator interface 110, as shown in FIG. 5. In this way, the operators 160 may monitor/track their score and scores of the other operators 160. By entering the gamification mode and viewing how each operator's loading practices compare to their peers, the operators 160 may be motivated to improve guest throughput and attraction wait times for their assigned attraction.

Figures 4, 5:
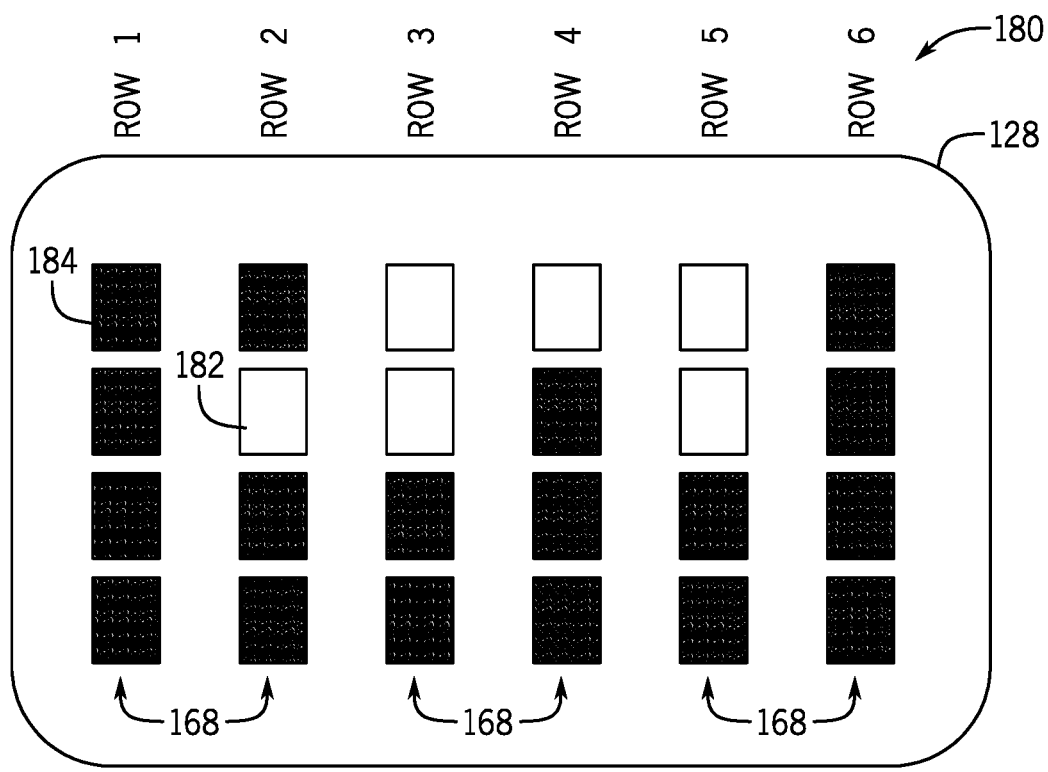
FIG. 4 is an example seat map rendered on an operator display screen of an operator interface of the system of FIG. 2, in accordance with an embodiment of the present disclosure.
FIG. 5 is an example gaming environment rendered on an operator display screen of an operator interface of the system of FIG. 2, in accordance with an embodiment of the present disclosure.

FIG. 5 is a simplified schematic illustration of an example gaming environment 190 accessible when the operator interface 110 is placed into the gamification mode. The gaming environment 190 as illustrated depicts different scores for different attractions, and which of the operators 160 are members of each team. In this example scenario, TEAM B would be considered to have a higher cumulative team score than TEAM A, indicating that operators 3 and 4 are operating ATTRACTION 1 with a higher degree of efficiency compared to operators 1 and 2. In the ATTRACTION 2 example scenario, TEAM C has a higher cumulative score than TEAM D, even though operators 7 and 8 are each running ATTRACTION 2 at a much higher efficiency than operator 5. In this case, operator 6 is operating ATTRACTION 2 at such a high efficiency that the reduced efficiency of operator 5 is overcome. In this respect, the gamification logic, in calculating operator scores, may also provide a straightforward tool for pairing operators together to maximize overall attraction efficiency on a shift-by-shift basis. In this way, very efficient operators can be paired with less efficient operators to ensure that overall attraction efficiency is maintained.

Figure 6:
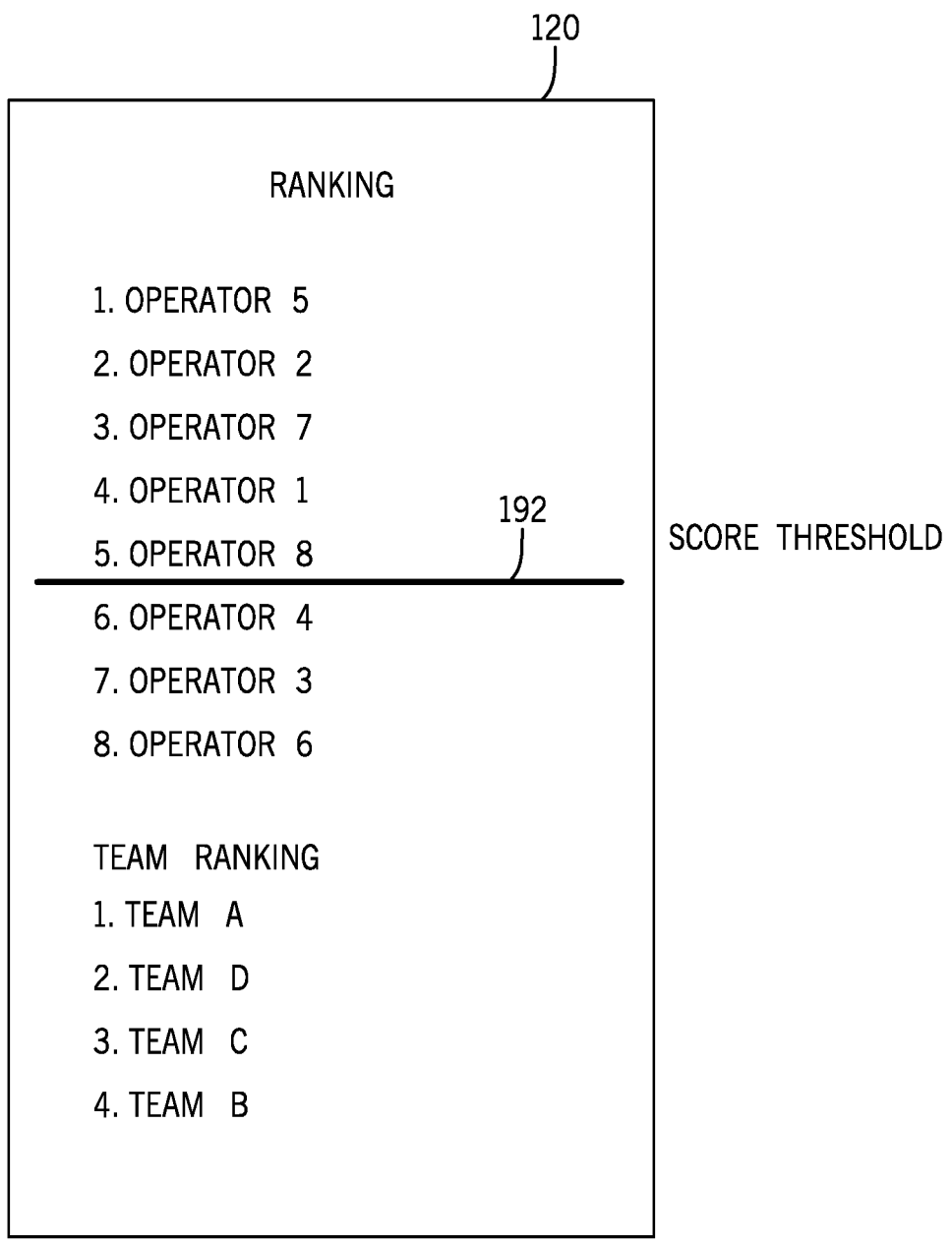
FIG. 6 is an example leaderboard of the queue management system of FIG. 2, in accordance with an embodiment of the present disclosure.

The operators 160 or team of operators 160 may be ranked based on their score. The rankings, as set forth above, may be displayed on the leaderboard 120 which may be a physical electronic display located in an employee lounge and/or staff offices, or may be a virtual chart that is rendered on the display 128 of the operator interface 110. FIG. 6 illustrates an example embodiment of the leaderboard 120 listing how the operators 160 and teams of operators 160 rank amongst other operators 160 based on the score obtained while in the gamification mode for the same and/or different attractions. In particular, the leaderboard 120 shown in FIG. 6 depicts team and operator rankings resulting from the scores shown in the gaming environment 190 of FIG. 5.

In the illustrated embodiment, the operator 160 and team of operators 160 having the best score (e.g., having the most efficient loading practices) are listed as number 1. The leaderboard 120 may be updated at any time interval (e.g., hourly, daily, weekly, in real-time) based on the analysis of the information obtained by the operator interface 110 and/or the queue and seating computer system 102. As shown, the leaderboard 120 may display a threshold marker 192 to illustrate which of the operators 160 and/or team of operators 160 met or exceeded the threshold. In this way, the operators 160 may gauge how they compare to other operators 160 across various attractions, and may receive feedback related to their loading practices.

The gamification mode of the operator interfaces 110 may allow the operators 160 to challenge one another for the highest guest throughput, lowest attraction wait time, or any other operator-controlled task related to a flow of the guests through the attraction. While in the gamification mode, the operator interface 110 may provide visual indicators such as comparisons of wait times and/or guest throughput for the attractions assigned to each operator in real time to determine which of the operators 160 is efficiently loading guests 22 onto the attraction ride vehicles 108. The gamification mode may incentivize the operators 160 to improve guest throughput and wait times by enabling them to earn points based on guest loading and throughput efficiency. For example, the memory 122 of the operator interface 110 may store threshold values for a desired maximum attraction wait time (e.g., the maximum amount of time a guest is in queue based on a number of guests attending the amusement park, popularity of the respective attraction, park peak hours, and combinations thereof) and/or a desired minimum number of guests loaded onto the attraction ride vehicle 108 (e.g., guest throughput) over a predetermined amount of time (e.g., per hour, per operator shift, per day).

Again, the scores may be calculated by the gamification logic in a number of ways and the magnitude of the score may have a direct or indirect correlation with loading efficiency. In other words, a direct correlation would involve a higher score magnitude corresponding to higher efficiency, while an indirect correlation would involve a higher score magnitude corresponding to a lower efficiency. As one example of how a score may relate to a metric, each cycle of the attraction may be scored based on how may available seats 182 are in the attraction ride vehicle 108 (or overall attraction) as a function of the concurrent wait time for the attraction. That is, if an attraction has a capacity of 40 of the guests 22, but the wait time for the attraction is zero (no guests 22 are waiting), then sending only partially full attraction ride vehicles 108 with available seats 182 will not affect (e.g., penalize) an operator score. However, if the attraction has guests 22 that are waiting, any available seats 182 in the attraction may negatively impact the operator score.

Figure 7:
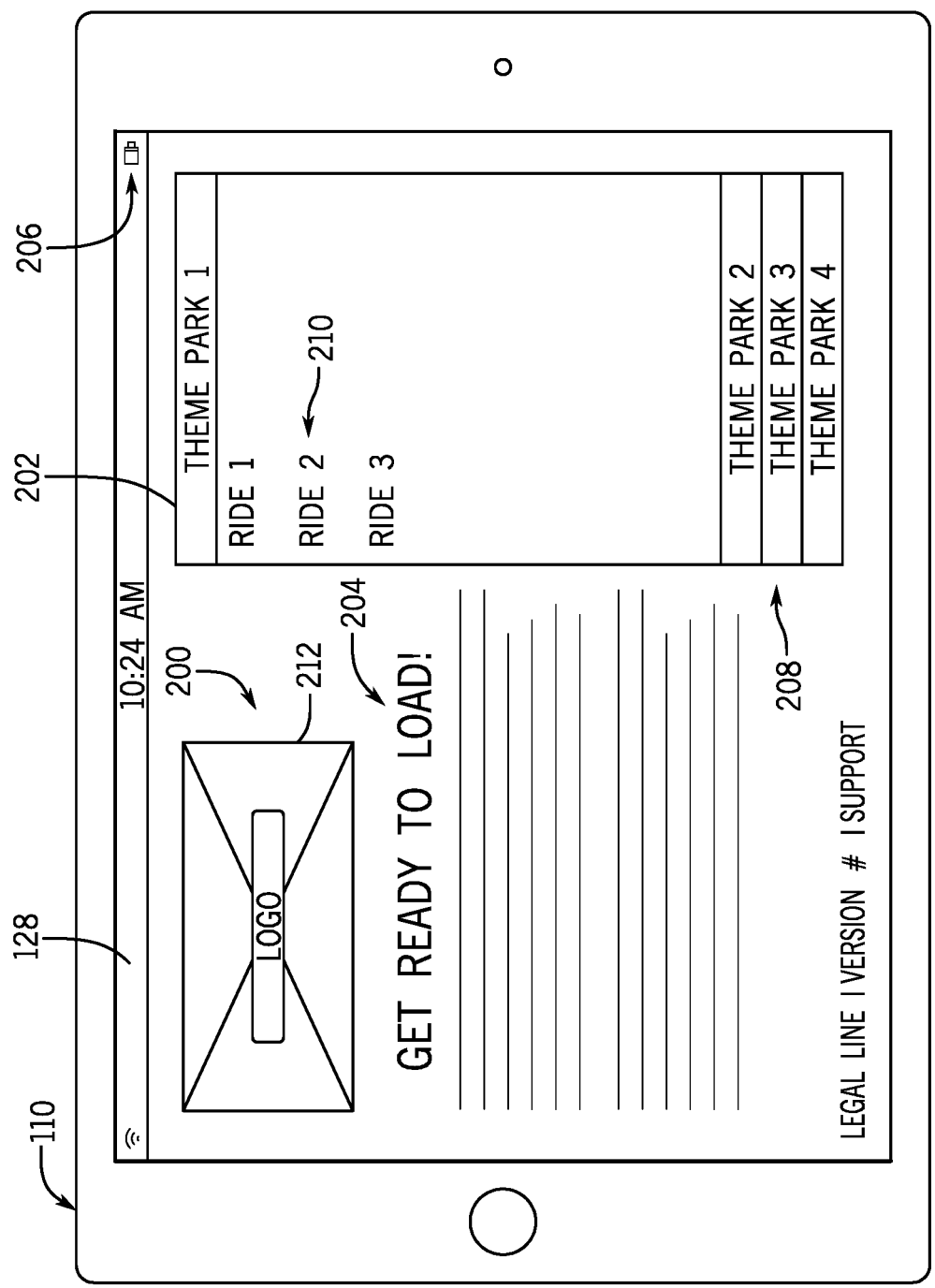
FIG. 7 is an example of a seating application graphical user interface (GUI) rendered by a display of an operator interface of the queue management system of FIG. 2, in accordance with an embodiment of the present disclosure.

As discussed herein, disclosed embodiments utilize the software application 126 executed on the operator interface 110 to facilitate integration of various attraction operating activities. The operator interface 110, as noted, may run a graphical user interface (GUI) associated with the seating application 126 to allow the operators 160 to initiate, access and interact with various modules (e.g., sets of instructions) that perform the seating assignment, analytic, and gamification techniques described herein. FIGS. 7-11 depict examples of a seating application GUI 200 rendered by the display 128 of the operator interface 110. In accordance with disclosed embodiments and as shown in FIG. 7, the seating application GUI 200 may include interface elements 202 (e.g., selectable graphic elements) that are individually selectable using one or more of the I/O devices 130, such as capacitive touch elements associated with the display 128. Other elements rendered on the seating application GUI 200 may include graphics 204 such as text, logos associated with a particular attraction and/or amusement park, status indicators 206, and so forth. Each of the interface elements 202 may, for example, represent a set of executable instructions that are initiated when selected. Thus, for example, when one of the interface elements 202 is selected, the seating application 126 may cause additional graphics to be rendered, various user interfaces and/or information to be presented depending on the logic associated with the particular interface element 202.

In the illustrated embodiment, the interface elements 202 include a menu of selectable theme park elements 208. The selectable theme park elements 208 may correspond to different properties associated with an amusement park, or different themed areas of the amusement park. When selected, the theme park elements 208 cause individual sub-menus having a particular set of selectable ride elements 210 to be displayed. The ride elements 210 may correspond to individual ride attractions (e.g., ride 42).

In FIG. 7, the "Theme Park 1" theme park element 208 has been selected, which causes a sub-menu displaying "Ride 1," "Ride 2," and "Ride 3" ride elements 210 to be presented. In response to selection of one of the ride elements 210, the seating application 126 may follow logic rules that cause subsequent operations within the seating application GUI 200 to be performed specifically with respect to the selected ride (e.g., one of Ride 1, Ride 2, or Ride 3).

The seating application GUI 200 may also include a loading user interface (UI) element 212, which may be a specific type of the interface elements 202 that causes the seating application 126 to initiate the seating arrangement and, in some embodiments, analysis and gamification logic described herein. In accordance with disclosed embodiments, selection of the loading UI element 212 may cause the seating application GUI 200 to present a new screen associated with a loading UI 220, as shown in FIG. 8.

Figure 8:
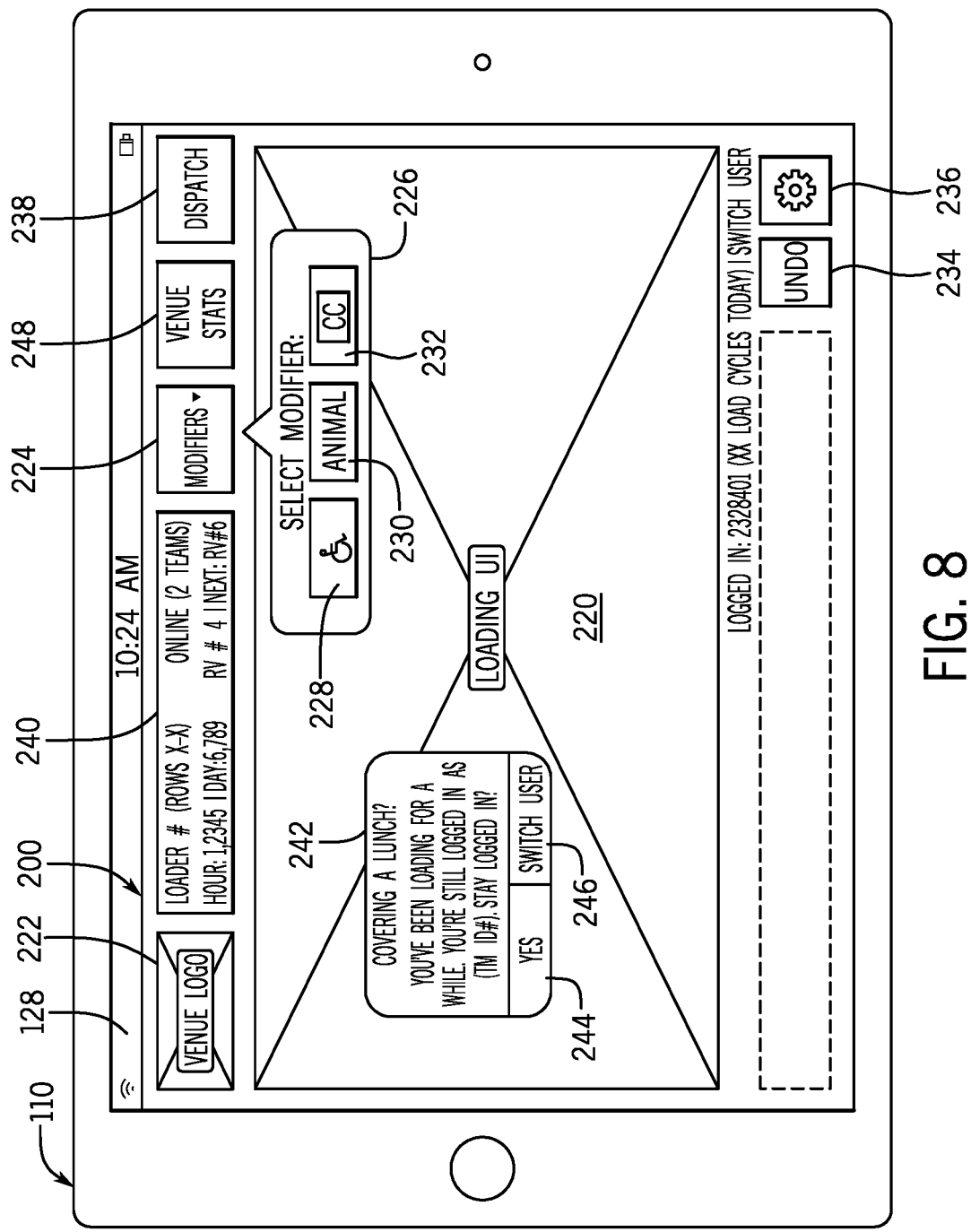
FIG. 8 is another example of the seating application GUI of FIG. 7 and depicting a loading user interface (UI), in accordance with an embodiment of the present disclosure.
Figure 10:
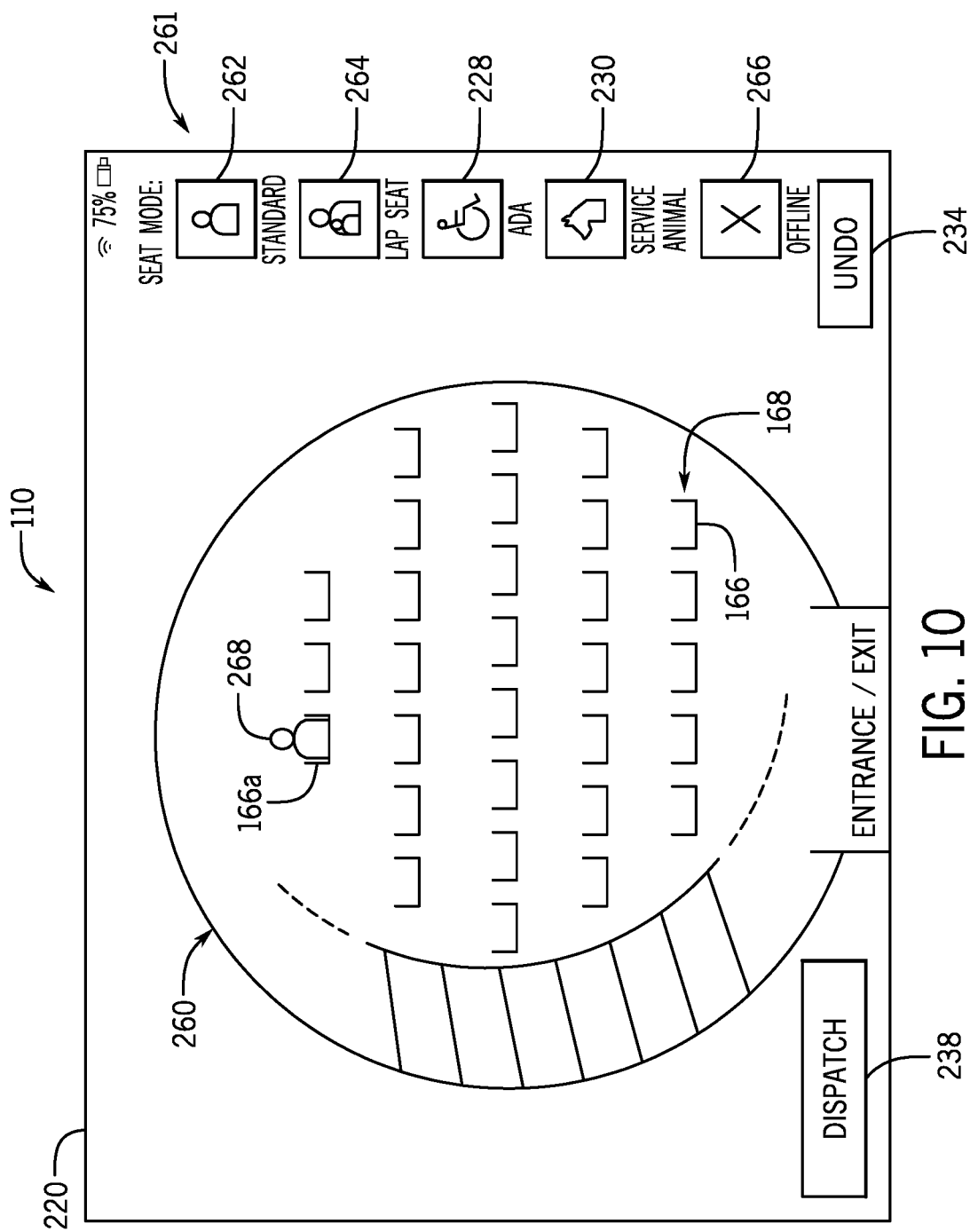
FIG. 10 is an example of a loading UI rendered by an operator interface of the system of FIG. 2, in accordance with an embodiment of the present disclosure.
Figure 11:
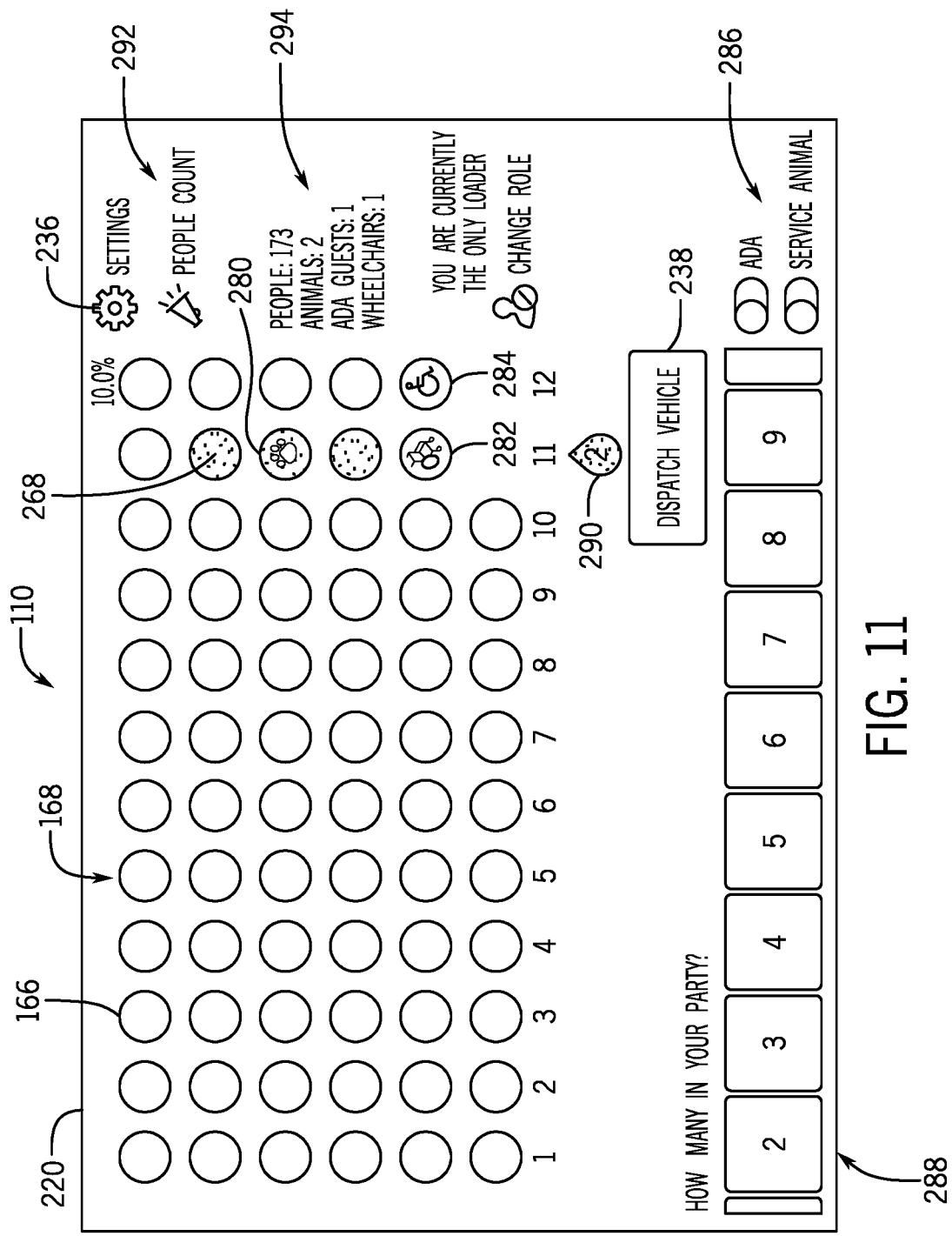
FIG. 11 is another example of a loading UI rendered by an operator interface of the system of FIG. 2, in accordance with an embodiment of the present disclosure.

In FIG. 8, the loading UI screen of the seating application GUI 200 includes several different types of interface elements 202, including the loading UI 220, specific examples of which are illustrated in FIGS. 10 and 11 and are described in further detail below. The interface elements 202 also include a venue element 222, which may be selected to cause the seating application GUI 200 to return to the previous screen shown in FIG. 7 to allow selection of other parks, rides, and so forth. The seating application GUI 200 shown in FIG. 8 may include several interface elements 202 specifically configured to assist with loading operations, in addition to the loading UI 220 itself. For example, as shown, such interface elements 202 may include a modifiers element 224 which, when selected, causes a pop-up modifier menu 226 to be displayed. The pop-up modifier menu 226 may include a series of seat modification elements such as a wheelchair element 228, a service animal element 230, and a closed caption element 232, each of which may be selected to modify the manner in which a particular seat 166 of the attraction ride vehicle 108 is occupied.

Other interface elements 202 may include an undo element 234, which allows previous operations to be undone, as well as a settings element 236. The settings element 236 may be selected to access a settings menu associated with various user preferences (e.g., preferences associated with a particular one of the operators 160 such as a profile), settings associated with a particular attraction (e.g., standby times), settings associated with the ride state model, and so forth. A dispatch element 238 may be selected once the ride attraction vehicle 108 is considered to be ready for dispatch along, for example, a track. As an example, the ride attraction vehicle 108 may be considered ready for dispatch once a sufficient number of seats 166 (e.g., all the available seats 166) have been changed to an occupied status by the ride operator 160. It should be noted that while the seating application 126 includes programming to recognize that a particular attraction ride vehicle 108 is completely occupied, the seating application 126 may still require the operator 160 to confirm that the attraction ride vehicle 108 is ready via the dispatch element 238.

In accordance with certain of the disclosed embodiments, selecting the loading UI element 212 may initiate execution of analysis and gamification logic associated with the seating application 126. Thus, certain of the elements rendered in the seating application GUI 200 depicted in FIG. 8 may relate to analytics and gamification. For example, certain of the graphics 204 shown in FIG. 8 include identifying information 240 indicating status information (e.g., that the operator interface 110 and/or the ride is online), which of the attraction ride vehicles 108 are associated with the operator interface 110, which of the attraction ride vehicles 108 is being currently loaded, how many teams are competing using the gamification logic, time, date, and so forth.

Because the analytic logic of the seating application 126 tracks time in operation and other time-related metrics, the seating application 126 may also track how long the operator 160 has been using the seating application 126, and specifically the loading UI 220. In response to determining that the loading UI 220 has been in use for a particular amount of time, the seating application GUI 200 may display a notification box 242 indicating that the operator 160 has been using the loading UI 220 for an extended period of time, and may request a response to close the notification box 242. In particular, the notification box 242 is rendered with two interaction elements 202—one that is a confirmation element 244 that indicates that the operator 160 wishes to remain logged in, and another that is a switch user element 246 that allows the operator 160 to switch to another profile. Thus, present embodiments may facilitate encouragement of desired breaks for operations personnel.

Figure 9:
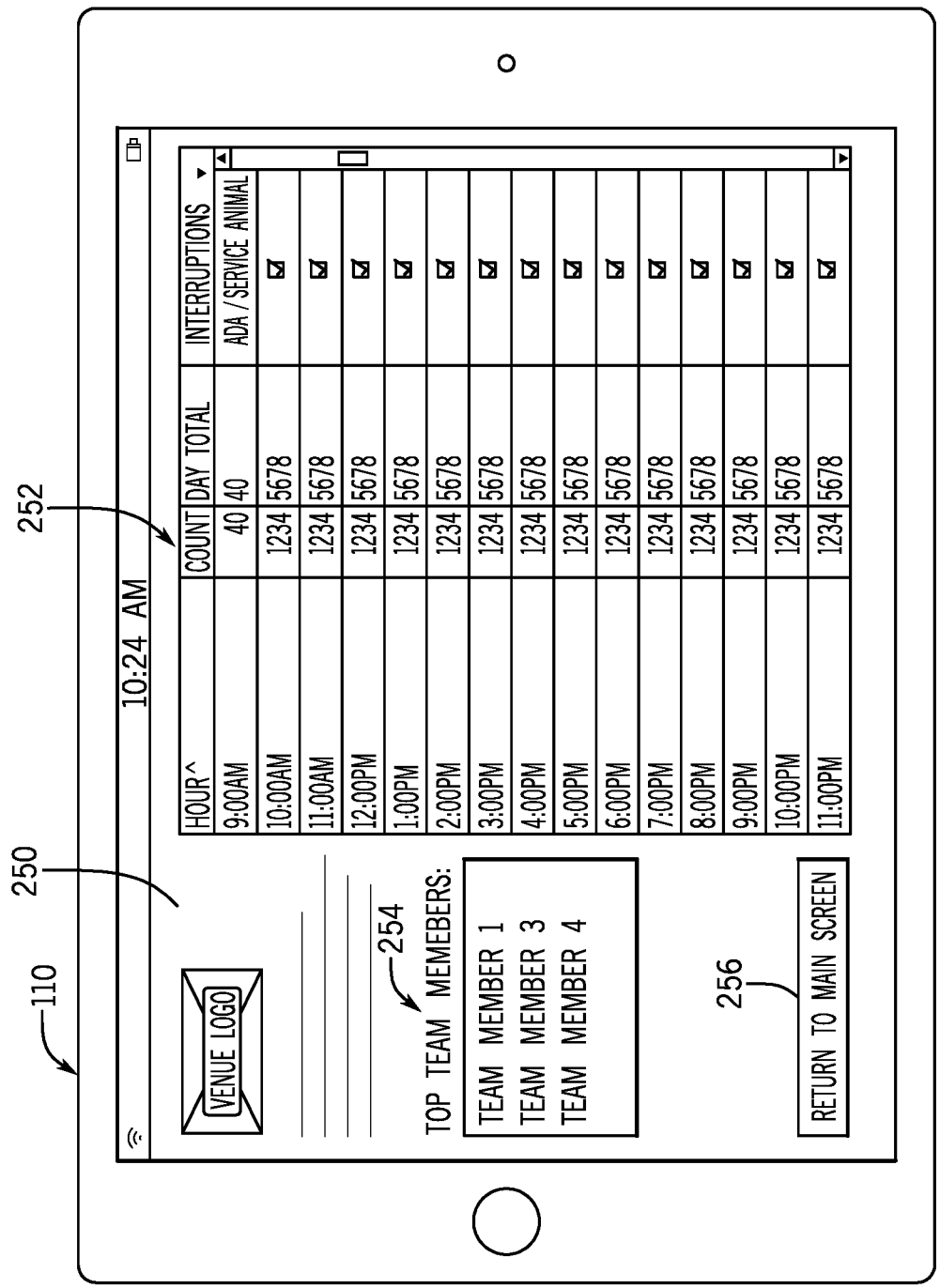
FIG. 9 is an example of a venue statistics screen including statistical graphics relating to a ride attraction, in accordance with an embodiment of the present disclosure.

Statistics may be tracked not only for the operator 160, but also for the particular attraction or venue in which the seating application 126 is used. These statistics may be viewed by selecting a venue stats element 248, resulting in the GUI screen shown in FIG. 9. In particular, FIG. 9 depicts an example of a venue statistics screen 250, which includes statistical graphics 252 relating to a ride attraction sorted according to a time of the day. The statistical graphics 252 as shown include a total count of guests 22 that were loaded onto attraction ride vehicles 108 associated with the attraction (venue) according to the time, and how this number compares to the total count of loaded guests for that day. Interruptions to loading efficiency, such as the use of ADA or service animal elements when loading, may also be indicated.

The venue statistics screen 250 may also present leaderboard graphics 254 ranking the top operators 160 for the particular venue. For example, the leaderboard graphics 254 may rely on the scores calculated in accordance with the gamification logic of the seating application 126, and the operators 160 having the scores indicating the most efficiency may be listed toward the top of the leaderboard graphic 254.

Any one or a combination of the statistical graphics 252 and leaderboard graphics 254 entries may be individually selectable to access further information relating to the displayed information. For instance, if a ride operator 160 would like to know how one of the other operators 160 was able to move to the top of the leaderboard graphic 254, the operator 160 may tap the particular team member's number and the GUI 200 may present the particular team member's statistics (e.g., provided that the operator 160 has access privileges to such information).

As noted, FIGS. 10 and 11 provide examples of the loading UI 220, which is rendered based on instructions associated with the seating application 126, which is in turn run on the operator interface 110. The loading UI 220 as illustrated in FIG. 10 includes a virtual representation 260 of the attraction ride vehicle 108. While the virtual representation 260 may generally approximate the shape of the exterior of the attraction ride vehicle 108, it should be noted that this is not a requirement, and the shape is only required to accommodate an accurate representation of the actual seating arrangement that is internal to the real-world attraction ride vehicle 108. In certain embodiments, the ride state model associated with the seating logic for the particular attraction rid vehicle 108 may provide the seating arrangement information, as well as whether any one or a combination of the seats 160 is modifiable in accordance with modifier elements described herein.

The loading UI 220 may include a rendering of seats 166 and rows 168 of seats 166 that represents the arrangement of the attraction ride vehicle 108 in accordance with the ride state model. The loading UI 220 of FIG. 10 also includes a variety of seat modifier elements 261, such as the ADA seat element 228, the service animal seat element 230, a standard seat element 262, a lap seat element 264, and an offline seat element 266. In accordance with disclosed embodiments, the seat modifier elements 261 may be individually selectable to modify any one or a combination of the seats 166. Specifically, for example, the standard seat element 262 may be used to denote that a particular seat 166 is occupied in a standard configuration, the lap seat element 264 (where permitted, according to the ride state model) may be used to denote that a child is sitting in the lap of an adult for a particular seat 166, the offline seat element 266 may be used to take one or more of the seats 166 offline, and so forth.

In the particular loading GUI 220 of FIG. 10, the seats 166 are rendered as being able to accommodate graphics that are representative of the type of seat modification applied to the particular seat 166. For example, to apply the standard seat element 262 to one of the seats 166, the operator 160 would first select the standard seat element 262, and then select the particular seat 166 where the standard seating arrangement will occur. In the illustrated embodiment, a first of the seats 166a is selected for such a modification, and is rendered in combination with a standard seating graphic 268.

FIG. 11 is an illustration of another embodiment of the loading UI 220 rendered on the operator interface 110, and includes many of the same interface elements 202 as set forth above with respect to FIGS. 7-10. The loading UI 220 of FIG. 11 includes, in a similar fashion as described with respect to FIG. 10, a seating arrangement that accurately portrays the seating layout of a particular ride attraction vehicle 108. Certain of the seats 166 are shown as occupied using graphics associated with certain of the seat elements. For example, certain of the seats 166 are rendered in combination with the standard seating graphic 268 (in this embodiment, a filled-in circle), a service animal graphic 280, a wheelchair graphic 282, and an ADA guest graphic 284.

In this embodiment, the seating logic associated with the loading GUI 220 assumes that every seat selection is a standard one, and accordingly there is no standard seating element used to modify the seats 166. Here, a standard seat is changed to another type using radio button elements 286 including an ADA radio button element and a service animal radio button element. The seating logic may also provide an option in response to selection of the ADA radio button element to modify more than one seat 166—for example one seat 166 may be modified to indicate an ADA guest and another seat 166 may be modified to indicate the presence of a wheelchair.

The loading GUI 220 of FIG. 11 also includes multiple ways in which the operator 160 can indicate the number of guests 22 for loading onto the attraction ride vehicle 108. For example, each of the seats 166 may be individually selectable to add guests 22 one-by-one. However, the seating logic of the seating application 126 is configured to automatically implement logic rules when the total number of guests 22 in a party is entered, for example via guest count button elements 288. The seating logic may, for example, provide a recommendation regarding how to split the group of guests 22 in the event that the rows 168 cannot accommodate the size of the party. In such embodiments, for example, the loading GUI 220 may display a recommended number of guests 22 for a particular row 168 using a guest number graphic 290. In the illustrated embodiment, the guest number graphic 290 is a teardrop graphic indicating the number of guests 22 to place into the row 168 with which the guest number graphic 290 is associated.

As one example, and referring to the arrangement shown in FIG. 11, a group of seven guests 22 may not be accommodated into a single one of the rows 168. In such a situation, according to the seating logic implemented by the seating application 126, the party should be separated in a way that guests from the same party do not sit alone. Thus, in one of the rows, a guest number graphic 290 with a number 5 may be rendered for a first row (indicating that 5 of the 7 guests should be guided to the first row), and another guest number graphic 290 with a number 2 may be rendered for a second row adjacent to the first row (indicating that 2 of the 7 guests should be guided to the second row). In this way, the loading GUI 220 assists the operator 160 in implementing guest loading strategies in accordance with the seating logic.

The loading GUI 220 of FIG. 11 may also include a people count element 292, which when selected causes the loading GUI 220 to display various types of counts. In particular, as shown in FIG. 11, the loading GUI 220, in response to selection of the people count element 292, displays count graphics 294 including a total count of people, a total count of service animals, a total count of ADA guests, and a total count of wheelchairs. Such statistical information may be used, from an analysis/gamification standpoint, to determine whether decreases in loading efficiency may be due to non-standard seating situations.

As discussed above, embodiments of the queue management system disclosed herein integrate a virtual queue system with ride seating logic, analytical tools, and a gamification feature that incentivizes operators of an attraction to increase their queueing and loading efficiency. Operator interfaces, such as tablet computers, are also programmed with seating application software to enable the interfaces to serve as a tool for allowing ride operators to have more efficient loading practices and to access gaming environments. Disclosed embodiments may enable the operators to challenge operators of other attractions for, by way of example, best loading parameters. Accordingly, the operators may compare (or gaming logic may compare) their respective attraction wait times, guest throughput, and other parameters for their assigned attraction with those of other operators. The operators may earn points based on a comparison of their respective loading parameters to predetermined threshold values for their assigned attraction. The points may be scored and displayed on a leaderboard that ranks the operators based on their respective loading parameters. In addition, the queue management system may generate reports based on the operator's loading parameters and transmit the reports to management teams. The management teams may use this information to evaluate performance of the operators.

While only certain features of the present disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system for providing seating guidance for an attraction ride vehicle of an amusement park attraction, comprising:
   a computing device associated with a display;
   one or more processors of the computing device; and
   one or more memory devices of the computing device storing information about the attraction ride vehicle and storing instructions corresponding to a seating application, wherein the seating application, when executed by the one or more processors, causes the computing device to:
      provide an interface to receive seating input data from an operator for a guest or a group of guests;
      process the seating input data in combination with the information about the attraction ride vehicle based on seating logic to provide seat location information in the attraction ride vehicle for the guests or the group of guests
      output the seat location information via the display;
      receive data indicative of unoccupied seats in the attraction ride vehicle; and
      generate a metric for the operator based on the data indicative of unoccupied seats in the attraction ride vehicle.

2. The system of claim 1, wherein the information about the attraction ride vehicle stored by the one or more memory devices comprises a ride state model having the seat location information for the attraction ride vehicle.

3. The system of claim 2, wherein the seat location information for the attraction ride vehicle comprises at least a seat layout of the attraction ride vehicle, availability and location of any wheelchair-accessible seats, whether seats within the seat layout may be taken offline via the interface, or whether the attraction ride vehicle allows service animals.

4. The system of claim 3, wherein the seating application, when executed by the one or more processors, is configured to adjust the ride state model in response to receiving operator input data indicative of changes in the seat location information.

5. The system of claim 1, wherein the computing device is a portable computing device and the display is a touchscreen display of the portable computing device, wherein the interface is a graphical user interface (GUI) that presents a view of a seat map of occupied and unoccupied seats of the attraction ride vehicle.

6. The system of claim 5, wherein the GUI is configured to receive the seating input data via the touchscreen display and to output the seat location information for loading the guest or the group of guests as the guest or group of guests move through a ride loading area associated with the attraction ride vehicle.

7. The system of claim 1 comprising sensing equipment configured to track ride occupancy of the attraction ride vehicle to provide the data indicative of unoccupied seats in the attraction ride vehicle, wherein the seating application is configured to use the data to provide updated seat location information in response to identifying mismatches between the seat location information previously provided and tracked ride occupancy.

8. The system of claim 1, wherein the seating application comprises analytic logic that tracks the metric.

9. The system of claim 8, wherein the seating application comprises gamification logic that integrates the tracked metric into a gaming environment that generates scores for the operator relating to loading efficiency.

10. The system of claim 9, wherein the gamification logic integrates scores from other ride operators into the gaming environment to encourage higher loading efficiency.

11. The system of claim 10, comprising a queue and seating computer system communicatively coupled to the computing device and a plurality of additional computing devices configured to run the seating application, wherein the queue and seating computer system comprises one or more memory devices and one or more processing devices configured to maintain a leaderboard that tracks scores of the operator and the other ride operators, teams of operators, or both, for the amusement park attraction.

12. An amusement park venue, comprising:
an arrangement of seats to accommodate a guest or a group of guests;
a computing device associated with the amusement park venue and having one or more processors and one or more memory devices, wherein the one or more memory devices store information about the amusement park venue and store instructions corresponding to a seating application, wherein the seating application, when executed by the one or more processors, causes the computing device to:
provide an interface to receive seating input data from an operator for the guest or the group of guests;
process the seating input data in combination with the information about the amusement park venue based on seating logic to generate guidance data;
output guidance, based on the guidance data, that provides direction for the guest or the group of guests to particular seats of the amusement park venue via a display communicatively coupled to the one or more processors;
receive data indicative of unoccupied seats in the amusement park venue after the guests have occupied the particular seats of the amusement park venue; and
generate a metric for the operator based on the data indicative of unoccupied seats in the amusement park venue; and
a sensing system configured to acquire the data indicative of unoccupied seats in the amusement park venue.

13. The venue of claim 12, comprising an entrance configured to control guest access to the amusement park venue via a queue management system, wherein the queue management system comprises devices configured to monitor a virtual queue, a physical queue, or both, of guests waiting to enter the amusement park venue, and to coordinate guest access into the amusement park venue based on the guidance output by the computing device.

14. The venue of claim 13, wherein the queue management system comprises a queue and seating computer system communicatively coupled to the computing device, wherein the queue and seating computer system comprises one or more networked computers configured to establish and maintain the virtual queue.

15. The venue of claim 14, comprising a queue monitoring device communicatively coupled to the queue and seating computer system and configured to monitor a physical queue associated with the amusement park venue, and to provide feedback relating to guests in the physical queue to the queue and seating computer system.

16. The venue of claim 15, wherein the queue and seating computer system is configured to push updates for the seating application to the computing device based at least in part on the feedback generated by the queue monitoring device.

17. A tangible, non-transitory, machine-readable medium, comprising machine-readable instructions executable by a processor to:
present at least a portion of a seating application on a graphical user interface (GUI) via a display of a computing device, the computing device having access to a queue and seating computer system, the queue and seating computer system comprising features that allow for control over virtual queueing and seating for one or more amusement park attractions, and wherein the at least a portion of the seating application has a seating guidance user interface (UI) associated therewith to receive seating inputs from an operator to select one or more seats of the one or more amusement park attractions;
perform a seating guidance process via the GUI and the seating guidance UI using analytics data associated with seating efficiency for the one or more amusement park attractions, the analytics data defining indicators or metrics, wherein the machine-readable instructions are configured to cause a portion of the GUI rendered on the display to include a plurality of interaction elements that affect a manner in which the seating guidance process is performed according to seating logic associated with the seating application;
receive data indicative of unoccupied seats in the one or more amusement park attractions per cycle of the one or more amusement park attractions; and
generate a metric for the operator based on the data indicative of unoccupied seats in the one or more amusement park attractions.

18. The tangible, non-transitory, machine-readable medium of claim 17, wherein the metric for the operator is higher based on a group of guests being assigned to a single row or consecutive rows of an attraction ride vehicle or lower based on the group of guests being assigned to nonconsecutive rows of the attraction ride vehicle.

19. The system of claim 1, wherein the data is camera data.

20. The system of claim 1, wherein the seating application causes the computing device to receive wait time information of the amusement park attraction, and wherein the metric is further based on the wait time information such that the metric does not penalize the operator for the data indicative of unoccupied seats during periods when an attraction wait time is zero.

* * * * *